United States Patent
Loccufier et al.

(10) Patent No.: US 10,767,063 B2
(45) Date of Patent: Sep. 8, 2020

(54) AQUEOUS INKJET INKS

(71) Applicant: AGFA-GEVAERT NV, Mortsel (BE)

(72) Inventors: Johan Loccufier, Mortsel (BE);
Fabienne Goethals, Mortsel (BE);
Hubertus Van Aert, Mortsel (BE);
Dirk Kokkelenberg, Mortsel (BE)

(73) Assignee: AGFA-Gevaert NV, Mortsel (BE)

( * ) Notice: Subject to any disclaimer, the term of this patent is extended or adjusted under 35 U.S.C. 154(b) by 0 days.

(21) Appl. No.: 15/574,550

(22) PCT Filed: May 18, 2016

(86) PCT No.: PCT/EP2016/061063
§ 371 (c)(1),
(2) Date: Nov. 16, 2017

(87) PCT Pub. No.: WO2016/184878
PCT Pub. Date: Nov. 24, 2016

(65) Prior Publication Data
US 2018/0201798 A1    Jul. 19, 2018

(30) Foreign Application Priority Data
May 19, 2015 (EP) .................................... 15168099

(51) Int. Cl.
*C09D 11/00* (2014.01)
*C09D 11/328* (2014.01)
(Continued)

(52) U.S. Cl.
CPC .......... *C09D 11/328* (2013.01); *B41M 3/142* (2013.01); *B41M 7/009* (2013.01); *C09D 11/32* (2013.01);
(Continued)

(58) Field of Classification Search
CPC ................................ C09D 11/30; C09D 11/50
See application file for complete search history.

(56) References Cited

U.S. PATENT DOCUMENTS 5,922,115 A * 7/1999 Sano ...................... C09D 11/50
106/31.23
6,203,603 B1 * 3/2001 Takayama .............. B41M 5/128
106/31.16
(Continued)

FOREIGN PATENT DOCUMENTS

EP    0 980 028 A1    2/2000
EP    1 362 710 A1   11/2003
(Continued)

OTHER PUBLICATIONS

Magdassi, Shlomo. The Chemistry of Inkjet Inks, World Scientific Publishing Co Pte Ltd, 2009. ProQuest Ebook, p. 34 (Year: 2009).*
(Continued)

*Primary Examiner* — James E McDonough
(74) *Attorney, Agent, or Firm* — Stinson LLP

(57) ABSTRACT

An aqueous inkjet ink for forming a colour upon heat treatment includes a) an immobilized leuco dye; b) a colour developing agent or colour developing agent precursor; and c) optionally an opthothermal converting agent; wherein the leuco dye is immobilized by being covalently bonded to polymeric particles or by being included in the core of capsules composed of a polymeric shell surrounding a core.

13 Claims, 1 Drawing Sheet

(51) Int. Cl.
*C09D 11/40* (2014.01)
*C09D 11/50* (2014.01)
*B41M 7/00* (2006.01)
*C09D 11/32* (2014.01)
*B41M 3/14* (2006.01)
*C09D 11/38* (2014.01)
*C09D 1/00* (2006.01)
*C09D 4/00* (2006.01)
*C09D 5/00* (2006.01)
*C09K 3/00* (2006.01)

(52) U.S. Cl.
CPC .............. *C09D 11/38* (2013.01); *C09D 11/40* (2013.01); *C09D 11/50* (2013.01); *B41M 3/14* (2013.01)

(56) References Cited

U.S. PATENT DOCUMENTS

| | | | |
|---|---|---|---|
| 6,786,954 B1* | 9/2004 | Lee | B41M 3/14 106/31.13 |
| 6,793,721 B2 | 9/2004 | Lin | B41M 3/142 106/31.2 |
| 6,899,752 B2* | 5/2005 | Sekioka | B41M 3/144 106/31.32 |
| 6,926,764 B2* | 8/2005 | Bleikolm | B41M 3/14 106/31.27 |
| 7,892,338 B2* | 2/2011 | Degott | B41M 3/14 106/31.32 |
| 8,398,760 B2* | 3/2013 | Jarvis | B41M 5/26 106/31.32 |
| 8,500,895 B2* | 8/2013 | Blank | B41M 5/30 106/31.32 |
| 2001/0008164 A1* | 7/2001 | Sano | C09D 11/50 156/221 |
| 2003/0089270 A1* | 5/2003 | Shen | C09D 11/30 106/31.2 |
| 2005/0031838 A1* | 2/2005 | Lagunowich | B41M 3/144 428/211.1 |
| 2014/0099267 A1* | 4/2014 | Jarvis | C09D 11/037 424/10.3 |
| 2014/0106963 A1* | 4/2014 | Ribi | G01N 31/229 503/216 |
| 2014/0272161 A1* | 9/2014 | Clayton | B01J 13/18 427/424 |
| 2015/0064419 A1* | 3/2015 | Stolarz, Jr. | C09D 11/10 428/199 |
| 2017/0313120 A1* | 11/2017 | Philippe | B42D 25/41 |

FOREIGN PATENT DOCUMENTS

EP 1 398 175 A2 3/2004
JP 2012-224827 A 11/2012

OTHER PUBLICATIONS

Official Communication issued in International Patent Application No. PCT/EP2016/061063, dated Sep. 14, 2016.

* cited by examiner

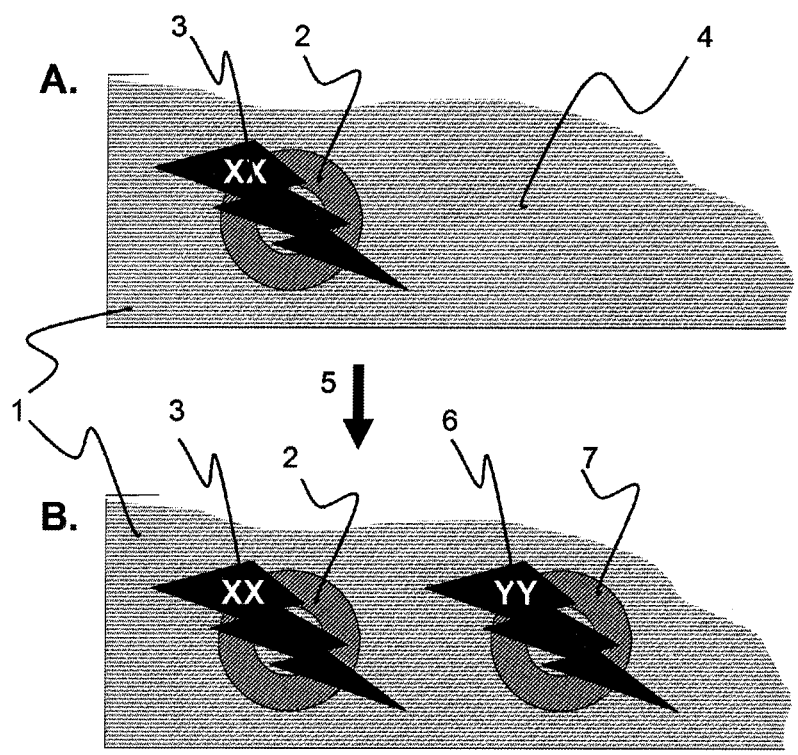
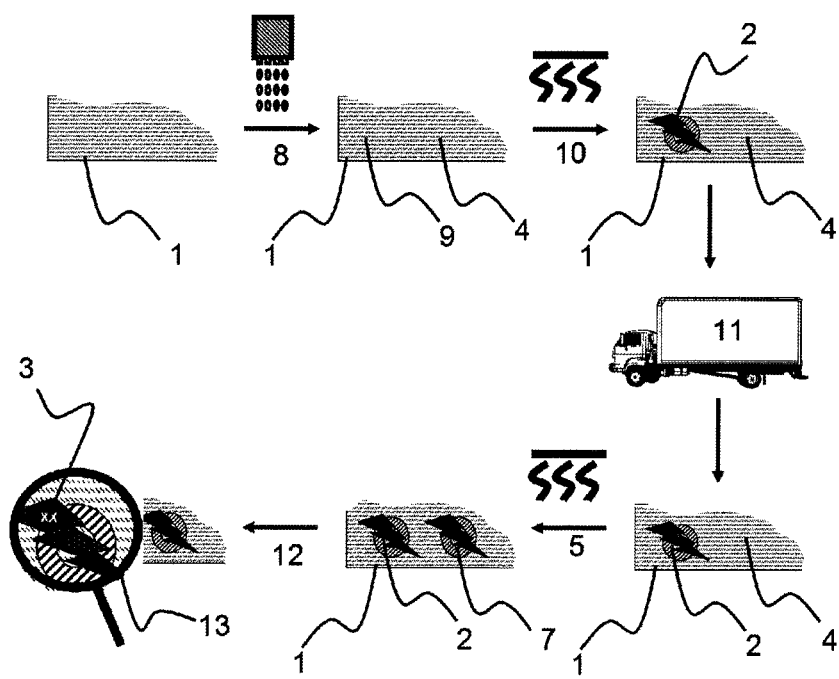
Fig. 1
Fig. 2

US 10,767,063 B2

AQUEOUS INKJET INKS

CROSS REFERENCE TO RELATED APPLICATIONS

This application is a 371 National Stage Application of PCT/EP2016/061063, filed May 18, 2016. This application claims the benefit of European Application No. 15168099.8, filed May 19, 2015, which is incorporated by reference herein in its entirety.

BACKGROUND OF THE INVENTION

1. Field of the Invention

This invention relates to aqueous inkjet inks for detecting counterfeiting.

2. Description of the Related Art

Counterfeiting is a global problem affecting every sector of the economy, especially perfumes, luxury handbags, electronics, etc. However, the consequences are different when it comes to counterfeit medicines or food articles; the main concern is not so much the loss of revenue to industry but the health of patients or consumers. According to the World Health Organisation 25% of all medicines in less developed countries are counterfeit, and often sub standard or ineffective. In China, authorities have found that some medicines have a counterfeit prevalence ranging between 50 and 85%.

For printing pharmaceutical en food packaging, offset and flexography are being increasingly replaced by industrial inkjet printing systems, because of their enhanced reliability allowing incorporation into production lines. Another advantage of inkjet is its flexibility in use, such as variable data printing making short production runs and personalized products possible.

Inkjet printing has been suggested as a tool for fighting counterfeiting. For example, EP 1398175 A (AGFA) and EP 1362710 A (AGFA) disclose specific inkjet printed watermarks which are difficult to counterfeit.

Many other anti-counterfeit measures, such as holograms and RFID tags, have been implemented by industry in the past. However, after a while these anti-counterfeit measures became themselves copied or counterfeited, obliging a company to develop new anti-counterfeit measures.

Furthermore in less developed countries, sophisticated tools for verifying the authenticity of a product, e.g. RFID tag readers, are often simply not available.

Hence, there is still a need to find long-term solutions to stop counterfeiting of pharmaceutical and food products.

SUMMARY OF THE INVENTION

In order to overcome the problems described above, preferred embodiments of the present invention have been realised with aqueous inkjet inks as defined below.

An aqueous inkjet ink was developed for printing an image that was invisible until a heat treatment was applied. Inkjet printing methods employing these inks are disclosed that show how this can be exploited to fight counterfeiting.

The inkjet inks can also be advantageously used for marking and coding applications. For example, an expiration date of a food product can be laser marked into an inkjet printed image of a food packaging.

Further advantages and embodiments of the present invention will become apparent from the following description.

BRIEF DESCRIPTION OF THE DRAWINGS

FIG. 1 includes Part A. which shows a part of a packaging (1) having an inkjet printed and heat treated visible image (2) containing alphanumerical data (3) and an inkjet printed invisible second image (4) which has not yet received any heat treatment, and Part B. which shows that the inkjet printed invisible second image (4) after applying a heat treatment (5) is developed into a visible image (7) containing different alphanumerical data (6) differing from than the alphanumerical data (3) of the image (2).

FIG. 2 shows the authentication process of a packaging. A packaging (1) is inkjet printed (8) with an image (9) and a second image (4). By a heat treatment (10), the invisible image (9) becomes a visible image (2). The product in its packaging is transported (11) to its customer (e.g. a pharmacy) where the invisible second image (4) becomes a visible image (7) by a heat treatment (5). The customer inspects (12) the images by a magnifying glass (13) to read the alphanumerical data (3).

DETAILED DESCRIPTION OF THE PREFERRED EMBODIMENTS

Definitions

The term alkyl means all variants possible for each number of carbon atoms in the alkyl group i.e. methyl, ethyl, for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethyl-propyl and 2-methyl-butyl etc.

The term alkoxy means all variants possible for each number of carbon atoms in the alkyl group i.e. methoxy, ethoxy, for three carbon atoms: n-propoxy and isopropoxy; for four carbon atoms: n-butoxy, isobutoxy and tertiary-butoxy etc.

The term aryloxy means Ar—O— wherein Ar is an optionally substituted aryl group.

Unless otherwise specified a substituted or unsubstituted alkyl group is preferably a $C_1$ to $C_6$-alkyl group.

Unless otherwise specified a substituted or unsubstituted alkenyl group is preferably a $C_2$ to $C_6$-alkenyl group.

Unless otherwise specified a substituted or unsubstituted alkynyl group is preferably a $C_2$ to $C_6$-alkynyl group.

Unless otherwise specified a substituted or unsubstituted aralkyl group is preferably a phenyl group or a naphthyl group including one, two, three or more $C_1$ to $C_6$-alkyl groups.

Unless otherwise specified a substituted or unsubstituted alkaryl group is preferably a $C_1$ to $C_6$-alkyl group including an aryl group, preferably a phenyl group or naphthyl group.

Unless otherwise specified a substituted or unsubstituted aryl group is preferably a substituted or unsubstituted phenyl group or naphthyl group.

A cyclic group includes at least one ring structure and may be a monocyclic- or polycyclic group, meaning one or more rings fused together.

A heterocyclic group is a cyclic group that has atoms of at least two different elements as members of its ring(s). The counterparts of heterocyclic groups are homocyclic groups, the ring structures of which are made of carbon only. Unless otherwise specified a substituted or unsubstituted heterocyclic group is preferably a five- or six-membered ring substituted by one, two, three or four heteroatoms, preferably selected from oxygen atoms, nitrogen atoms, sulfur atoms, selenium atoms or combinations thereof.

An alicyclic group is a non-aromatic homocyclic group wherein the ring atoms consist of carbon atoms.

The term heteroaryl group means a monocyclic- or polycyclic aromatic ring comprising carbon atoms and one or more heteroatoms in the ring structure, preferably, 1 to 4 heteroatoms, independently selected from nitrogen, oxygen, selenium and sulphur. Preferred examples of heteroaryl groups include, but are not limited to, pyridinyl, pyridazinyl, pyrimidyl, pyrazyl, triazinyl, pyrrolyl, pyrazolyl, imidazolyl, (1,2,3)- and (1,2,4)-triazolyl, pyrazinyl, pyrimidinyl, tetrazolyl, furyl, thienyl, isoxazolyl, thiazolyl, isoxazolyl, and oxazolyl. A heteroaryl group can be unsubstituted or substituted with one, two or more suitable substituents. Preferably, a heteroaryl group is a monocyclic ring, wherein the ring comprises 1 to 5 carbon atoms and 1 to 4 heteroatoms.

The term substituted, in e.g. substituted alkyl group means that the alkyl group may be substituted by other atoms than the atoms normally present in such a group, i.e. carbon and hydrogen. For example, a substituted alkyl group may include a halogen atom or a thiol group. An unsubstituted alkyl group contains only carbon and hydrogen atoms.

Unless otherwise specified a substituted alkyl group, a substituted alkenyl group, a substituted alkynyl group, a substituted aralkyl group, a substituted alkaryl group, a substituted aryl, a substituted heteroaryl and a substituted heterocyclic group are preferably substituted by one or more substituents selected from the group consisting of methyl, ethyl, n-propyl, isopropyl, n-butyl, 1-isobutyl, 2-isobutyl and tertiary-butyl, ester, amide, ether, thioether, ketone, aldehyde, sulfoxide, sulfone, sulfonate ester, sulfonamide, —Cl, —Br, —I, —OH, —SH, —CN and —NO$_2$.

Aqueous Inkjet Inks

An aqueous inkjet ink according to a preferred embodiment of the present invention contains: a) an immobilized leuco dye; b) a colour developing agent or colour developing agent precursor; and c) optionally an opthothermal converting agent; wherein the leuco dye is immobilized by being covalently bonded to polymeric particles or by being included in the core of capsules composed of a polymeric shell surrounding a core.

The aqueous inkjet ink is capable of forming a colour upon heat treatment. The colour is formed by the reaction of the immobilized leuco dye with the colour developing agent.

In a preferred embodiment, the aqueous inkjet ink contains a colour developing agent precursor, so that the colour developing agent is formed from a colour developing agent precursor upon heat treatment. Since two reaction steps are now necessary, i.e. 1) formation of a colour developing agent followed by 2) reaction with an immobilized leuco dye. The advantage of having two reaction steps before colour formation is an enhanced stability, which can be observed by enhanced shelf of the aqueous inkjet ink and enhanced light stability of a printed image, especially an inkjet printed invisible image which not yet received any heat treatment.

The heat treatment may be a direct heat treatment, wherein the heat is applied by conduction or convection. Alternatively the heat treatment is an indirect heat treatment, wherein radiation such as UV or IR radiation is applied and converted by an opthothermal converting agent into heat.

In a preferred embodiment, the aqueous inkjet ink contains an opthothermal converting agent, preferably selected from the group consisting of an infrared dye or an infrared absorbing pigment, such as a carbon black.

In a preferred embodiment, the colour developing agent precursor is a polymer particle capable of generating an acid upon exposure to heat. The advantage of the colour developing agent (precursor) being a polymer particle is that that, contrary to its low molecular weight equivalents, it does not migrate into the packaging material, possibly causing a health risk when the packaging is a food or pharmaceutical packaging.

The leuco dye is present in the aqueous inkjet ink in an immobilized form. This means that the leuco dye cannot freely migrate with the aqueous medium into the substrate, e.g. a food packaging.

In one embodiment, the immobilizing of the leuco dye is accomplished by having it covalently bound to a polymeric particle.

In another embodiment, the immobilizing of the leuco dye is accomplished by including in the core of capsules composed of a polymeric shell surrounding a core. The polymeric shell then separates the leuco dye from the aqueous medium of the inkjet ink.

In a preferred embodiment of the aqueous inkjet ink, the immobilized leuco dye is physically separated from the colour developing agent or colour developing agent precursor by the polymeric shell of a capsule.

For example, if the leuco dye is covalently bound to a polymeric particle, then the colour developing agent or colour developing agent precursor is preferably incorporated in the core of a capsule.

If the leuco dye is included in the core of a capsule, the colour developing agent or colour developing agent precursor is preferably present in the aqueous medium as a dispersion or in a different capsule than the capsule containing the leuco dye. Alternatively the colour developing agent precursor may also be present in the aqueous medium as a polymer particle capable of generating an acid upon exposure to heat.

In a preferred embodiment, an aqueous inkjet ink set containing two, three or more aqueous inkjet inks according to the invention is used to print an image. The aqueous inkjet inks of the ink set may contain different leuco dyes or the same leuco dye in different amounts.

In a particularly preferred embodiment, the aqueous inkjet ink set contains at least one aqueous inkjet ink containing one or more leuco dyes for forming a cyan or blue colour, at least one aqueous inkjet ink containing one or more leuco dyes for forming a magenta or red colour, at least one aqueous inkjet ink containing one or more leuco dyes for forming a yellow colour, and optionally at least one aqueous inkjet ink containing one or more leuco dyes for forming a black colour. Such an inkjet ink set can be used to form multi colour images, preferably in a multi-pass inkjet printing process.

In a more preferred embodiment, the aqueous inkjet inks each contain an opthothermal converting agent having an absorption maximum at a different wavelength, e.g. about 920, 1060 and 1150 nm in the case of three inkjet inks. Using three lasers having three similar emission wavelengths, the inkjet printed droplets of the three aqueous inkjet inks can be individually addressed.

The aqueous inkjet ink preferably have a viscosity at 25° C. and at a shear rate of 90 s$^{-1}$ of less than 50 mPa·s, more preferably less than 30 mPa·s.

The surface tension of the aqueous inkjet ink is preferably from 18 to 40 mN/m at 25° C., more preferably from 20 to 35 mN/m at 25° C.

Immobilized Leuco Dyes

The leuco dyes are "immobilized" by being covalently bonded to polymeric particles or by being included in the core of capsules composed of a polymeric shell surrounding a core.

By immobilizing the leuco dye, the risk of penetrating through a food or pharmaceutical packaging is minimized. Furthermore, the leuco dye cannot be extracted by moisture, e.g. by sweaty hands, before heat treatment or verification of the authenticity of the packaging.

All publicly-known leuco dyes can be used and are here below generally listed as low molecular weight compounds for incorporation into the core of a capsule, but they can equally well be covalently bound to a polymer particle.

Leuco dyes are well-known, for example, by being widely used in conventional pressure-sensitive, photosensitive or thermally-sensitive recording materials. Suitable leuco dyes and their reaction mechanisms are, for example, disclosed in Chemistry and Applications of Leuco Dyes, Ramaiah Muthyala, Plenum Press, 1997.

A number of classes of leuco dyes are preferred as colour forming compounds, such as for example: spiropyran leuco dyes such as spirobenzopyrans (e.g. spiroindolinobenzopyrans, spirobenzo-pyranobenzopyrans, 2,2-dialkyl-chromenes), spironaphtooxazine and spirothiopyran; leuco quinone dyes; azines such as oxazines, diazines, thiazines and phenazine; phthalide- and phthalimidine-type leuco dyes such as triarylmethane phtalides (e.g. crystal violet lactone), diarylmethane phthalides, monoarylmethane phthalides, heterocyclic substituted phthalides, alkenyl substituted phthalides, bridged phthalides (e.g. spirofluorene phthalides and spirobenzanthracene phthalides) and bisphthalides; fluoran leuco dyes such as fluoresceins, rhodamines and rhodols; triarylmethanes such as leuco crystal violet; ketazines; barbituric acid leuco dyes and thiobarbituric acid leuco dyes.

The capsules may comprise more than one leuco dye, typically to obtain a specific desired colour.

The leuco dye is preferably present in the inkjet printed image in an amount of 0.05 to 5.00 g/m², more preferably in an amount of 0.10 to 3.00 g/m², most preferably in an amount of 0.20 to 1.00 g/m².

In a preferred embodiment of an aqueous inkjet ink for producing a cyan colour, the cyan colour forming compound has a structure according to Formulae CCFC1, CCFC2 or CCFC3:

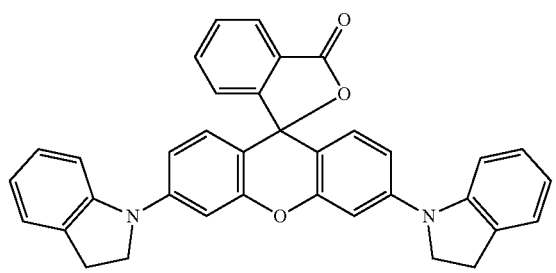

CCFC1

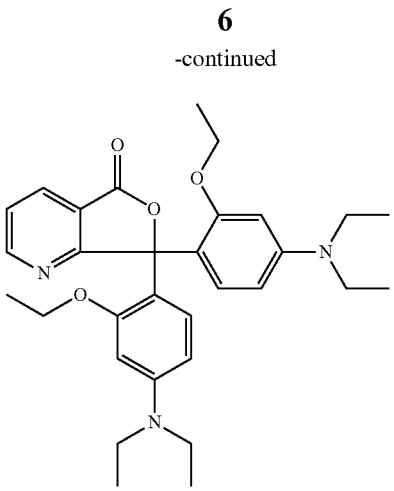

CCFC2

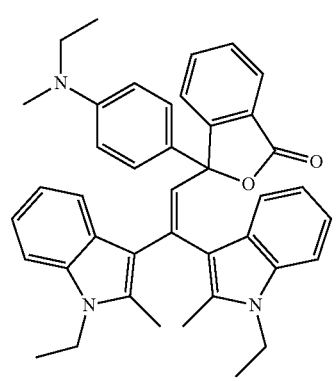

CCFC3

In a preferred embodiment of an aqueous inkjet ink for producing a magenta colour, the magenta colour forming compound has a structure according to Formula MCFC2:

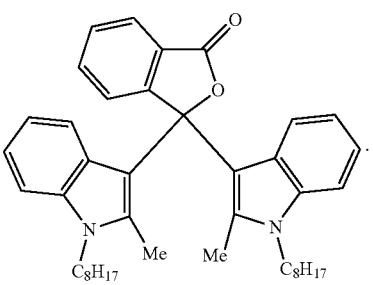

MCFC2

In a preferred embodiment of an aqueous inkjet ink for producing a red colour, the red colour forming compound has a structure according to Formula RCFC:

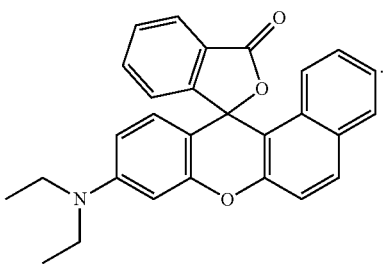

RCFC

In a preferred embodiment of an aqueous inkjet ink for producing a yellow colour, the yellow colour forming compound has a structure according to Formula YCFC:

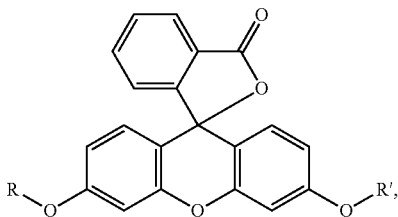

YCFC wherein R, R' are independently selected from a group consisting of a linear alkyl group, a branched alkyl group, an aryl and aralkyl group.

In one embodiment, the yellow colour forming compound has a structure according to Formula YCFC, wherein R and R' independently represent a linear alkyl group, a branched alkyl group, an aryl or an aralkyl group substituted by at least one functional group containing an oxygen atom, a sulfur atom or a nitrogen atom.

A particularly preferred yellow colour forming compound is the compound according to Formula YCFC wherein both R and R' are methyl.

In a most preferred embodiment of the aqueous inkjet ink for producing a yellow colour, the yellow colour forming compound has a structure according to Formulae YCFC1 or YCFC2:

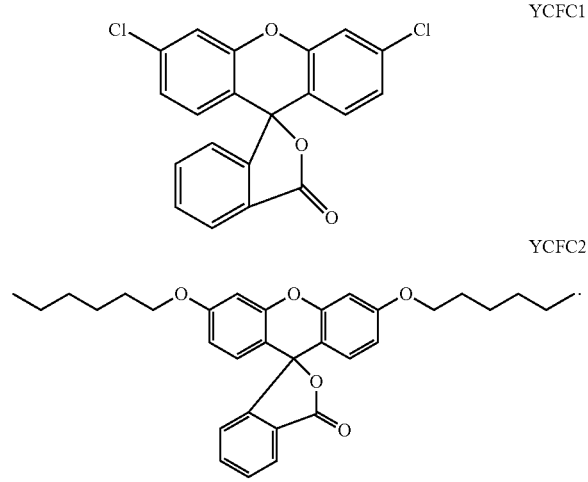 [SMILES: O=C1OC2(c3ccc(Cl)cc3Oc3cc(Cl)ccc32)c2ccccc21 ; CCCCCCOc1ccc2c(c1)Oc1cc(OCCCCCC)ccc1C21OC(=O)c2ccccc21]

YCFC1

YCFC2

In a preferred embodiment of an aqueous inkjet ink for producing a black colour, the black colour forming compound has a structure according to Formula BCFC:

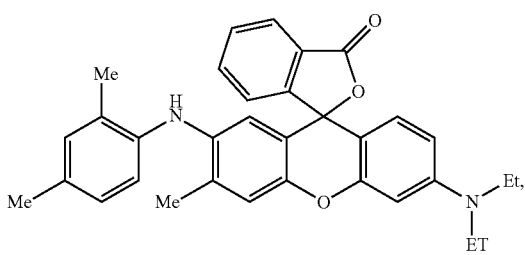

BCFC wherein Me=methyl and Et=Ethyl.

The capsules may contain two, three or more different leuco dyes in order to optimize the colour obtained upon heat treatment.

In a preferred embodiment of the aqueous inkjet ink, a leuco dye is covalently bound to a polymer particle.

The polymer particles have an average particle diameter measured by dynamic laser diffraction of from 10 nm to 800 nm, preferably from 15 to 350 nm, more preferably from 20 to 150 nm, most preferably from 25 nm to 100 nm.

In a preferred embodiment of the invention, the polymer particle is a copolymer comprising a monomeric unit containing a leuco dye. The monomer containing the leuco dye is preferably used in combination with other monomers selected from the group consisting of ethylene, vinylchloride, methylacrylate, methylmethacrylate ethylacrylate, ethylmethacrylate, vinylidene chloride, acrylonitrile, methacrylonitrile, vinylcarbazole, or styrene.

According to a preferred embodiment the monomer containing the leuco dye is preferably used in combination with styrene or derivatives thereof, mixtures comprising styrene and (meth)acrylonitrile or derivatives thereof.

The amount of monomers containing a leuco dye relative to the total weight of the polymer particles is preferably between 2 and 30 wt %, more preferably between 5 and 15 wt %. The amount of monomers containing a leuco dye is typically optimized in order to obtain sufficient colour formation upon exposure to heat or IR radiation.

The polymer particles are preferably prepared by an emulsion polymerization. Emulsion polymerization is typically carried out through controlled addition of several components—i.e. vinyl monomers, surfactants (dispersion aids), initiators and optionally other components such as buffers or protective colloids—to a continuous medium, usually water. The resulting polymer of the emulsion polymerization is a dispersion of discrete particles in water. The surfactants or dispersion aids which are present in the reaction medium have a multiple role in the emulsion polymerization: (1) they reduce the interfacial tension between the monomers and the aqueous phase, (2) they provide reaction sites through micelle formation in which the polymerization occurs and (3) they stabilize the growing polymer particles and ultimately the latex emulsion. The surfactants are adsorbed at the water/polymer interface and thereby prevent coagulation of the fine polymer particles. A wide variety of surfactants are used for the emulsion polymerisation. In general, a surfactant molecule contains both polar (hydrophilic) and non-polar (hydrophobic or lipophilic) groups. The most used surfactants are anionic or non-ionic surfactants. Widely used anionic surfactants are, alkylsulfates, alkyl ether sulfates, alkyl ether carboxylates, alkyl or aryl sulfonates, alkyl phosphates or alkyl ether phosphates. An example of an alkyl sulfate surfactant is sodium lauryl sulfate (e.g. Texapon K12 by the company Cognis). An example of an alkyl ether sulfate surfactant is laureth-2 sulfate sodium salt (e.g. Empicol ESB form the company Huntsman). An example of an alkyl ether carboxylate is laureth-6 carboxylate (e.g. Akypo RLM45 from the company Kao Chemicals). An example of an alkyl ether phosphate is Trideceth-3 phosphate ester (e.g. Chemfac PB-133 from the company Chemax Inc.).

The critical micelle concentration (C.M.C.) of the used surfactants is an important property to control the particle nucleation and consequently the particle size and stabilization of the polymer particles. The C.M.C. can be varied by variation of the degree of ethoxylation of the surfactant. Alkyl ether sulfates having a different degree of ethoxylation are for example Empicol ESA (Laurette-1 sulfate sodium salt), Empicol ESB (Laurette-2 sulfate sodium salt) and Empicol ESC (Laurette-3 sulfate sodium salt). Alkyl ether carboxylates having a different degree of ethoxylation are for example Akypo RLM-25 (Laurette-4 carboxylic acid), Akypo RLM-45 (Laurette-6 carboxylic acid) and Akypo RLM-70 (Laurette-8 carboxylic acid). Alkyl ether phosphates having a different degree of ethoxylation are for example Chemfac PB-133 (Trideceth-3 phosphate ester, acid form), Chemfac PB-136 (Trideceth-6-phosphate ester, acid form) and Chemfac PB-139 (Trideceth-9-phosphate ester, acid form).

The carboxylate and phosphate ester surfactants are usually supplied in the acid form. In order to prepare an aqueous solution of these surfactants, a base such as NaOH, $Na_2CO_3$, $NaHCO_3$, $NH_4OH$, or $NH_4HCO_3$ must be added.

In a preferred embodiment, the polymer particles are prepared by emulsion polymerization in the presence of a surfactant selected from alkyl phosphates and alkyl ether phosphates.

Another preferred method of preparing the polymer particles is the so-called mini-emulsion polymerization method as described for example by TANG et al. in Journal of Applied Polymer Science, Volume 43, pages 1059-1066 (1991) and by Blythe et al. in Macromolecules, 1999, 32, 6944-6951.

Instead of using surfactants to stabilize the polymer particles, self-dispersible polymer particles may also be used. In preparing self-dispersing polymer particles, preferably a monomer is used selected from the group consisting of a carboxylic acid monomer, a sulfonic acid monomer, and a phosphoric acid monomer.

Specific examples of the unsaturated carboxylic acid monomer include acrylic acid, methacrylic acid, crotonic acid, itaconic acid, maleic acid, fumaric acid, citraconic acid, and 2-methacryloyloxy methylsuccinic acid. Specific examples of the unsaturated sulfonic acid monomer include styrene sulfonic acid, 2-acrylamido-2-methyl propane sulfonic acid, 3-sulfopropyl (meth)acrylate, and bis-(3-sulfopropyl)-itaconate. Specific examples of the unsaturated phosphoric acid monomer include vinyl phosphoric acid, vinyl phosphate, and bis(methacryloxyethyl)phosphate. Such monomers may be incorporated into polyurethane copolymers which include a (meth)acrylate polymeric chain.

Besides traditional emulsion polymerization wherein nucleation, i.e. initiation of the polymerization, is done via micellar or homogeneous nucleation, the so-called mini-emulsion polymerization, may also be used to prepare the polymer particles. In emulsion polymerization, the nucleation occurs in the monomer droplet. See for example "Emulsion Polymerization and Emulsion Polymers", edited by Peter A. Lovell and Mohamed S. El-AASSER, 1997, page 42-43, wherein the different types of emulsion polymerization are described in more detail.

A mini-emulsion polymerization method is described in for example by TANG et al. in Journal of Applied Polymer Science, Volume 43, pages 1059-1066 (1991) and by Blythe et al. in Macromolecules, 1999, 32, 6944-6951.

Instead of using a monomer containing a leuco dye in a co-polymerization reaction to form the polymer particles, a leuco dye may also be covalently bonded to a already formed polymer particle, when reactive groups are present on the polymer particles which can react with a reactive leuco dye. To increase the efficiency of such a reaction, the reactive leuco dye may be added in a solvent which swells the polymer particles. That solvent may then be subsequently evaporated.

Capsules

The capsules used in a preferred embodiment of the present invention are composed of a polymeric shell surrounding a core. For achieving reliable inkjet printing, the capsules preferably have an average particle size of not more than 5 μm, more preferably of not more than 2 μm, most preferably of not more than 1 μm as determined by dynamic laser diffraction. Capsules having an average particle size smaller than 1 μm are typically called nanocapsules, while capsules having an average particle size above 1 μm are typically called microcapsules.

Upon heat treatment, a rupture of the capsule results in a reaction between the leuco dye and a colour developing agent which then causes colour formation.

The morphology of capsules and their preparation methods have been reviewed, for example, by Jyothi Sri. S in the International Journal of Pharma and Bio Sciences (Vol. 3, Issue 1, January-March 2012).

The capsules may have different morphologies, dependent on the preparation method of the capsules. For example mononuclear capsules have a shell around a core while polynuclear capsules have multiple cores enclosed within the shell. Matrix encapsulation refers to a core material which is homogeneously distributed into the shell.

Hydrophilic polymers, surfactants and/or polymeric dispersants may be used to obtain stable dispersions of the capsules in an aqueous medium and to control the particle size and the particle size distribution of the capsules.

In a preferred embodiment, the capsules are dispersed in the aqueous medium using a dispersing group covalently bonded to the polymeric shell. The dispersing group is preferably selected from a group consisting of a carboxylic acid or salt thereof, a sulfonic acid or salt thereof, a phosphoric acid ester or salt thereof, a phosphonic acid or salt thereof, an ammonium group, a sulfonium group, a phosphonium group and a polyethylene oxide group.

The dispersing groups stabilize the aqueous dispersion by electrostatic stabilization. For example, a slightly alkaline aqueous medium will turn the carboxylic acid groups covalently bonded to the polymeric shell into ionic groups, whereafter the negatively charged capsules have no tendency to agglomerate. If sufficient dispersing groups are covalently bonded to the polymeric shell, the capsule becomes a so-called self-dispersing capsule. Other dispersing groups such as sulfonic acid groups tend to be dissociated even in acid aqueous medium and thus do not require the addition of an alkali.

The dispersing group can be used in combination with a polymeric dispersant in order to accomplish steric stabilization. For example, the polymeric shell may have covalently bonded carboxylic acid groups that interact with amine groups of a polymeric dispersant. However, in a more preferred embodiment, no polymeric dispersant is used and dispersion stability is accomplished solely by electrostatic stabilization.

The capsules may also be stabilized by solid particles which adsorb onto the shell. Preferred solid particles are colloidal silica.

There is no real limitation on the type of polymer used for the polymeric shell of the capsule. Preferably, the polymer used in the polymeric shell is crosslinked. By crosslinking, more rigidity is built into the capsules allowing a broader range of temperatures and pressures for handling the aqueous inkjet ink.

Preferred examples of the polymeric shell material include polyureas, polyacrylates, polymethacrylates, polyurethanes, polyesters, polycarbonates, polyamides, melamine based polymers and mixtures thereof, with polyureas and polyurethanes being especially preferred.

Capsules can be prepared using both chemical and physical methods. Suitable encapsulation methodologies include complex coacervation, liposome formation, spray drying and polymerization methods.

In the present invention, preferably a polymerization method is used as it allows the highest control in designing the capsules. More preferably interfacial polymerization is used to prepare the capsules used in the invention. This technique is well-known and has recently been reviewed by Zhang Y. and Rochefort D. (Journal of Microencapsulation, 29(7), 636-649 (2012) and by Salitin (in Encapsulation Nanotechnologies, Vikas Mittal (ed.), chapter 5, 137-173 (Scrivener Publishing LLC (2013)).

Interfacial polymerization is a particularly preferred technology for the preparation of capsules according to the present invention. In interfacial polymerization, such as interfacial polycondensation, two reactants meet at the interface of the emulsion droplets and react rapidly.

In general, interfacial polymerization requires the dispersion of an oleophilic phase in an aqueous continuous phase or vice versa. Each of the phases contains at least one dissolved monomer (a first shell component) that is capable of reacting with another monomer (a second shell component) dissolved in the other phase. Upon polymerisation, a polymer is formed that is insoluble in both the aqueous and the oleophilic phase. As a result, the formed polymer has a tendency to precipitate at the interface of the oleophilic and aqueous phase, hereby forming a shell around the dispersed phase, which grows upon further polymerization. The capsules according to a preferred embodiment of the present invention are preferably prepared from an oleophilic dispersion in an aqueous continuous phase.

Typical polymeric shells, formed by interfacial polymerization are selected from the group consisting of polyamides, typically prepared from di- or poly-acid chlorides as first shell component and di- or oligoamines as second shell component; polyurea, typically prepared from di- or oligoisocyanates as first shell component and di- or oligoamines as second shell component; polyurethanes, typically prepared from di- or oligoisocyanates as first shell component and di- or oligoalcohols as second shell component; polysulfonamides, typically prepared from di- or oligosulfochlorides as first shell component and di- or oligoamines as second shell component; polyesters, typically prepared from di- or oligo-acid chlorides as first shell component and di- or oligoalcohols as second shell component; and polycarbonates, typically prepared from di- or oligo-chloroformates as first shell component and di- or oligoalcohols as second shell component and. The shell can be composed of combinations of these polymers.

In a further embodiment, polymers, such as gelatine, chitosan, albumin and polyethylene imine can be used as first shell components in combination with a di- or oligoisocyanate, a di- or oligo acid chloride, a di- or oligochloroformate and an epoxy resin as second shell component.

In a particularly preferred embodiment, the shell is composed of a polyurethane, a polyurea or a combination thereof.

In a further preferred embodiment, a water immiscible solvent is used in the dispersion step, which is removed by solvent stripping before or after the shell formation. In a particularly preferred embodiment, the water immiscible solvent has a boiling point below 100° C. at normal pressure. Esters are particularly preferred as water immiscible solvent. A preferred organic solvent is ethyl acetate, because it also has a low flammability hazard compared to other organic solvents.

A water immiscible solvent is an organic solvent having low miscibility in water. Low miscibility is defined as any water solvent combination forming a two phase system at 20° C. when mixed in a one over one volume ratio.

The method for preparing a dispersion of capsules preferably includes the following steps:

a) preparing a non-aqueous solution of a first shell component for forming a polymeric shell, a leuco dye, and optionally a water immiscible organic solvent having a lower boiling point than water;

b) preparing an aqueous solution of a second shell component for forming the polymeric shell;

c) dispersing the non-aqueous solution under high shear in the aqueous solution;

d) optionally stripping the water immiscible organic solvent from the mixture of the aqueous solution and the non-aqueous solution; and e) preparing the polymeric shell around the leuco dye by interfacial polymerization of the first and second shell components for forming the polymeric shell.

The optional optothermal converting agent may be added together with the leuco dye in step (a) to the non-aqueous solution resulting in capsules wherein both the leuco dye and the optothermal converting agent are included in the core of the capsule.

A single type of capsules may be included in one or more aqueous inkjet inks or a plurality of capsules may be included in a single aqueous inkjet ink.

In one embodiment, a single aqueous inkjet ink may contain two, three or four types of capsules each containing a different leuco dye and a different opthothermal converting agent.

In a more preferred embodiment, the aqueous inkjet ink contains capsules including one or more leuco dyes for forming a cyan or blue colour and a first opthothermal converting agent, capsules including one or more leuco dyes for forming a magenta or red colour and a second opthothermal converting agent having a wavelength at maximum absorption different from that of the first opthothermal converting agent, and capsules including one or more leuco dyes for forming a yellow colour and a third opthothermal converting agent having a wavelength at maximum absorption different from that of the first and second opthothermal converting agents.

Colour Developing Agents

A direct heat treatment (heat conduction/convection) or an indirect heat treatment (optothermal converting agent absorbing infrared radiation and converting that radiation into heat) disrupts the capsules whereupon the leuco dye comes into reactive contact with a colour developing agent which then triggers the colour formation.

The colour developing agent may be present in the aqueous medium of the inkjet ink or it may be present in the core of a capsule. In the aqueous medium, the colour developing agent is preferably present as a dispersion, e.g. by being covalently bound to a polymeric particle. Alternatively they may be also present in the core of a capsule, e.g. as a low molecular weight compound.

Various electron accepting substances may be used as colour developing agent. Examples thereof include phenolic compounds, organic or inorganic acidic compounds and esters or salts thereof.

Specific examples, which may covalently bounded to a polymeri particle, include bisphenol A; tetrabromobisphenol A; gallic acid; salicylic acid; 3-isopropyl salicylate; 3-cyclohexyl salicylate; 3-5-di-tert-butyl salicylate; 3,5-di-α-methyl benzyl salicylate; 4,4'-isopropylidenediphenol; 1,1'-isopropylidene bis(2-chlorophenol); 4,4'-isopropylene bis(2,6-dibromo-phenol); 4,4'-isopropylidene bis(2,6-dichlorophenol); 4,4'-isopropylidene bis(2-methyl phenol); 4,4'-isopropylidene bis(2,6-dimethyl phenol); 4,4'-isopropylidene bis(2-tert-butyl phenol); 4,4'-sec-butylidene diphenol; 4,4'-cyclohexylidene bisphenol; 4,4'-cyclohexylidene bis(2-methyl phenol); 4-tert-butyl phenol; 4-phenyl phenol; 4-hydroxy diphenoxide; α-naphthol; β-naphthol; 3,5-xylenol; thymol; methyl-4-hydroxybenzoate; 4-hydroxy-acetophenone; novolak phenol resins; 2,2'-thio bis(4,6-dichloro phenol); catechol; resorcin; hydroquinone; pyrogallol; fluoroglycine; fluoroglycine carboxylate; 4-tert-octyl catechol; 2,2'-methylene bis(4-chlorophenol); 2,2'-methylene bis(4-methyl-6-tert-butyl phenol); 2,2'-dihydroxy diphenyl; ethyl p-hydroxybenzoate; propyl p-hydroxybenzoate; butyl p-hydroxy-benzoate; benzyl p-hydroxybenzoate; p-hydroxybenzoate-p-chlorobenzyl; p-hydroxybenzoate-o-chlorobenzyl; p-hydroxybenzoate-p-methylbenzyl; p-hydroxybenzoate-n-octyl; benzoic acid; zinc salicylate; 1-hydroxy-2-naphthoic acid; 2-hydroxy-6-naphthoic acid; 2-hydroxy-6-zinc naphthoate; 4-hydroxy diphenyl sulfone; 4-hydroxy-4'-chloro diphenyl sulfone; bis(4-hydroxy phenyl)sulfide; 2-hydroxy-p-toluic acid; 3,5-di-tert-zinc butyl salicylate; 3,5-di-tert-tin butyl salicylate; tartaric acid; oxalic acid; maleic acid; citric acid; succinic acid; stearic acid; 4-hydroxyphthalic acid; boric acid; thiourea derivatives; 4-hydroxy thiophenol derivatives; bis(4-hydroxyphenyl) acetate; bis(4-hydroxyphenyl)ethyl acetate; bis(4-hydroxyphenyl)acetate-n-propyl; bis(4-hydroxy-phenyl)acetate-n-butyl; bis(4-hydroxyphenyl)phenyl acetate; bis(4-hydroxyphenyl)-benzyl acetate; bis(4-hydroxyphenyl)phenethyl acetate; bis(3-methyl-4-hydroxy-phenyl)acetate; bis(3-methyl-4-hydroxyphenyl)methyl acetate; bis(3-methyl-4-hydroxyphenyl)acetate-n-propyl; 1,7-bis(4-hydroxyphenylthio)-3,5-dioxaheptane; 1,5-bis(4-hydroxyphenylthio)-3-oxaheptane; 4-hydroxy phthalate dimethyl; 4-hydroxy-4'-methoxy diphenyl sulfone; 4-hydroxy-4'-ethoxy diphenyl sulfone; 4-hydroxy-4'-isopropoxy diphenyl sulfone; 4-hydroxy-4'-propoxy diphenyl sulfone; 4-hydroxy-4'-butoxy diphenyl sulfone; 4-hydroxy-4'-isopropoxy diphenyl sulfone; 4-hydroxy-4'-sec-butoxy diphenyl sulfone; 4-hydroxy-4'-tert-butoxy diphenyl sulfone; 4-hydroxy-4'-benzyloxy diphenyl sulfone; 4-hydroxy-4'-phenoxy diphenyl sulfone; 4-hydroxy-4'-(m-methyl benzoxy)diphenyl sulfone; 4-hydroxy-4'-(p-methyl benzoxy)diphenyl sulfone; 4-hydroxy-4'-(o-methyl benzoxy)diphenyl sulfone; 4-hydroxy-4'-(p-chloro benzoxy)diphenyl sulfone and 4-hydroxy-4'-oxyaryl diphenyl sulfone.

A preferred colour developing agent is a metal salt of salicylate, for example zinc salicylate. A particularly preferred colour developing agent is zinc 3,5-bis(α-methylbenzyl) salicylate.

Colour Developing Agent Precursors

For enhancing the shelf-life stability of the aqueous inkjet ink or the UV stability of the inkjet printed invisible image, a so-called colour developing agent precursor is used, which by the heat treatment becomes a colour developing agent.

The colour developing agent precursor may be present in the aqueous medium of the inkjet ink or it may be present in the core of a capsule. In the aqueous medium, the colour developing agent precursor is preferably present as a polymeric particle. Alternatively they may be also present in the core of a capsule, e.g. as a low molecular weight compound.

In a preferred embodiment, the colour developing agent precursor is a polymer particle, such as a latex. In a particularly preferred embodiment, the polymer particle is a vinylidenechloride copolymer particle.

All publicly-known thermal acid generators can be used as colour developing agent. Thermal acid generators are for example widely used in conventional photoresist material. For more information see for example "Encyclopaedia of polymer science", 4th edition, Wiley or "Industrial Photoinitiators, A Technical Guide", CRC Press 2010.

Preferred classes of photo- and thermal acid generators are iodonium salts, sulfonium salts, ferrocenium salts, sulfonyl oximes, halomethyl triazines, halomethylarylsulfone, α-haloacetophenones, sulfonate esters, t-butyl esters, allyl substituted phenols, t-butyl carbonates, sulfate esters, phosphate esters and phosphonate esters.

In a preferred embodiment, the colour developing agent precursor is a compound according to Formula (I) or Formula (II):

Formula (I)

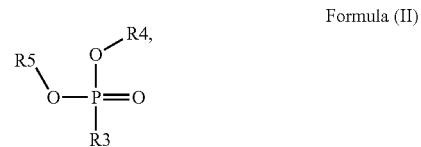

Formula (II)

wherein R1 and R3 independently represent an optionally substituted alkyl group, an optionally substituted (hetero) cyclic alkyl group, an optionally substituted (hetero)aryl group, an optionally substituted aralkyl group, an optionally substituted alkoxy group, an optionally substituted (hetero) cyclic alkoxy group, or an optionally substituted (hetero)aryl group; R2, R4 and R5 independently represent an optionally substituted alkyl, an optionally substituted aliphatic (hetero) cyclic alkyl group or an optionally substituted aralkyl group; R1 and R2, R4 and R5, R3 and R4, and R3 and R5 may represent the necessary atoms to form a ring.

Suitable alkyl groups for the colour developing agent precursor according to Formula (I) or Formula (II) include 1 or more carbon atoms such as for example $C_1$ to $C_{22}$-alkyl groups, more preferably $C_1$ to $C_{12}$-alkyl groups and most preferably $C_1$ to $C_6$-alkyl groups. The alkyl group may be linear or branched such as for example methyl, ethyl, propyl (n-propyl, isopropyl), butyl (n-butyl, isobutyl, t-butyl), pentyl, 1,1-dimethyl-propyl, 2,2-dimethylpropyl and 2-methyl-butyl, or hexyl.

Suitable cyclic alkyl groups for the colour developing agent precursor according to Formula (I) or Formula (II) include cyclopentyl, cyclohexyl or adamantyl.

Suitable heterocyclic alkyl groups include tetrahydrofuryl, piperidinyl, pyrrolidinyl, dioxyl, tetrahydrothiophenyl, silolanyl, or thianyl oxanyl.

Suitable aryl groups for the colour developing agent precursor according to Formula (I) or Formula (II) include for example phenyl, naphthyl, benzyl, tolyl, ortho-meta- or para-xylyl, anthracenyl or phenanthrenyl.

Suitable heteroaryl groups for the colour developing agent precursor according to Formula (I) or Formula (II) include monocyclic- or polycyclic aromatic rings comprising carbon atoms and one or more heteroatoms in the ring structure. Preferably 1 to 4 heteroatoms independently selected from nitrogen, oxygen, selenium and sulfur and/or combinations thereof. Examples include pyridyl, pyrimidyl, pyrazoyl, triazinyl, imidazolyl, (1,2,3)- and (1,2,4)-triazolyl, tetrazolyl, furyl, thienyl, isoxazolyl, thiazolyl and carbazoyl.

Suitable alkoxy groups for the colour developing agent precursor according to Formula (I) or Formula (II) include those containing from 1 to 18, preferably 2 to 8 carbon atoms, such as ethoxide, propoxide, isopropoxide, butoxide, isobutoxide and tert-butoxide.

Suitable aryloxy groups for the colour developing agent precursor according to Formula (I) or Formula (II) include phenoxy and naphthoxy.

The alkyl, (hetero)cyclic alkyl, aralkyl, (hetero)aryl, alkoxy, (hetero)cyclic alkoxy, or (hetero)aryloxy groups may include one or more substituents. The optional substituents are preferably selected from an alkyl group such as a methyl, ethyl, n-propyl, isopropyl, n-butyl, 1-isobutyl, 2-isobutyl and tertiary-butyl group; an ester, amide, ether, thioether, ketone, aldehyde, sulfoxide, sulfone, sulfonate ester or sulfonamide group, a halogen such as fluorine, chlorine, bromine or iodine, —OH, —SH, —CN and —NO$_2$, and/or combinations thereof.

R1 preferably represents a $C_1$ to $C_{22}$-alkyl group, an aliphatic alkoxide group containing 2 to 8 carbons, a phenyl group or a tolyl group. R1 most preferably represents a tolyl group.

R2 preferably represents a $C_1$ to $C_{22}$-alkyl group or a (hetero)cyclic alkyl group. R2 most preferably represents a cyclohexyl group.

R3 preferably represents a $C_1$ to $C_{22}$-alkyl group, an aliphatic alkoxide group containing 2 to 8 carbons or a benzyl group.

In a preferred embodiment, R4 and R5 independently represent a $C_1$ to $C_{22}$-alkyl group. In a preferred embodiment, R4 and R5 represent independently an isobutyl, t-butyl, isopropyl, 2-ethylhexyl or a linear $C_2$ to $C_8$-alkyl group.

The compound used in a preferred embodiment of the present invention can be a monomer, an oligomer (i.e. a structure including a limited amount of monomers such as two, three or four repeating units) or a polymer (i.e. a structure including more than four repeating units).

The compound used in a preferred embodiment of the present invention contains at least one moiety according to Formula I and/or Formula II, preferably 1 to 150 moieties according to Formula I and/or Formula II. According to a preferred embodiment, the compound according to Formula I or Formula II may be present in a side chain of a polymer In the embodiment wherein the compound according to Formula I or Formula II is present in the side chain of a polymer, the following moiety (Formula III, IV or V) is preferably attached to the polymer:

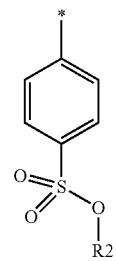

Formula III

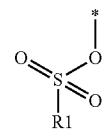

Formula IV

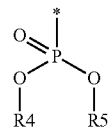

Formula V wherein, * denotes the linking to the polymer and R1, R2, R4 and R5 as described above.

In the embodiment wherein the compound according to Formula I is present in the side chain of a polymer, the polymer is more preferably obtained from the coupling of a polymer or copolymer bearing side chains with alcohol groups and a sulfonyl chloride.

In the embodiment wherein the compound according to Formula I is present in the side chain of a polymer, the polymer is most preferably obtained from the coupling of a polymer or copolymer bearing side chains with alcohol groups and tosyl chloride. Useful polymers bearing side chains with alcohol include for example polyvinyl alcohol, polyvinyl butyral, cellulose derivatives, homo- and copolymers of 2-hydroxyethyl methacrylate, 2-hydroxyethyl acrylate, polysiloxane derivatives such as copolymers of hydroxyalkyl-methylsiloxane, and novolac resins.

Examples of acid generating compounds suitable for the present invention are shown in Table 1.

TABLE 1

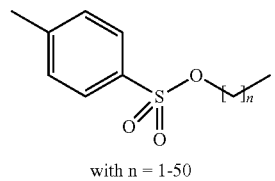

with n = 1-50

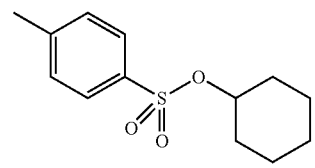 [SMILES: Cc1ccc(S(=O)(=O)OC2CCCCC2)cc1]

TABLE 1-continued
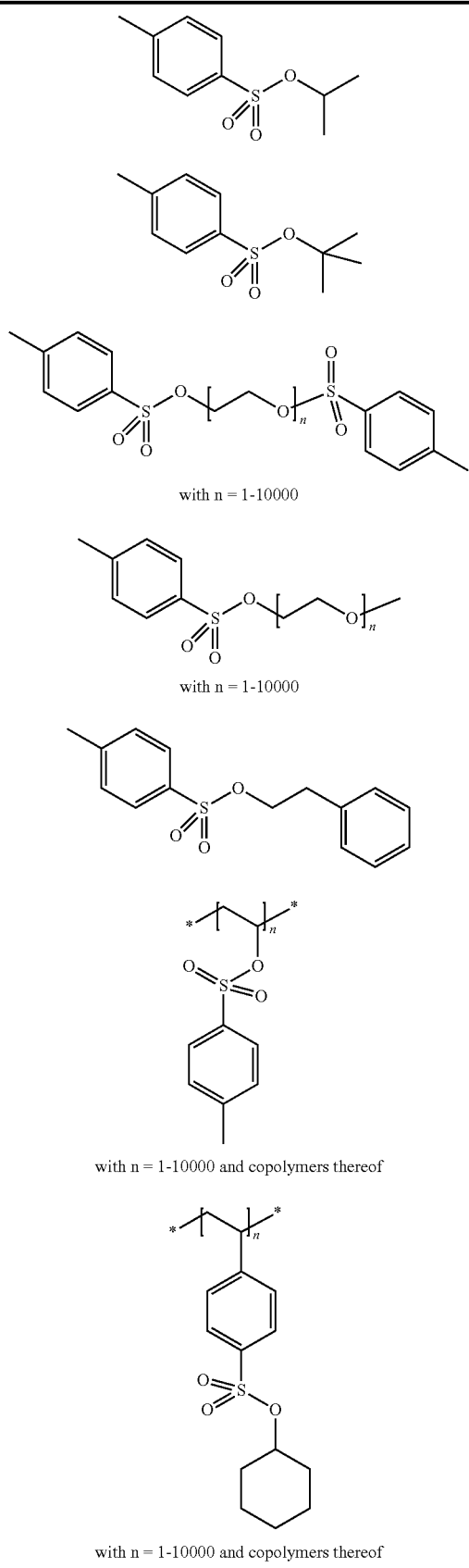
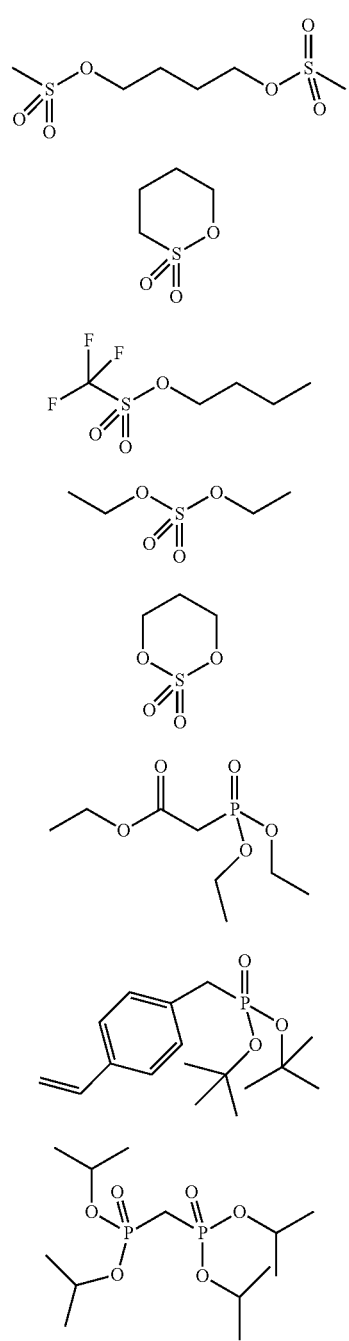
with n = 1-10000 and copolymers thereof and R representing an alkyl group, preferably a tertiary butyl-group TABLE 1-continued

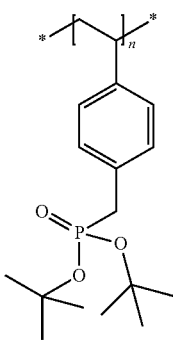

with n = 1-10000 and copolymers thereof

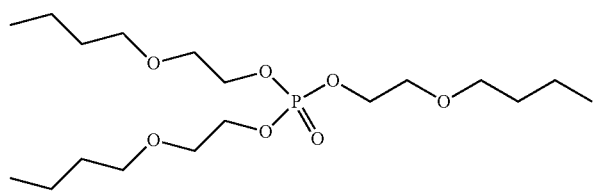 [SMILES: CCCCOCCOP(=O)(OCCOCCCC)OCCOCCCC]

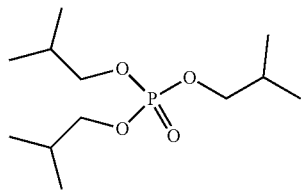 [SMILES: CC(C)COP(=O)(OCC(C)C)OCC(C)C]

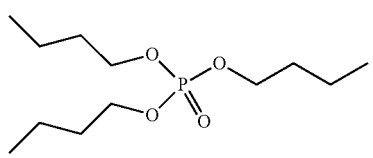 [SMILES: CCCCOP(=O)(OCCCC)OCCCC]

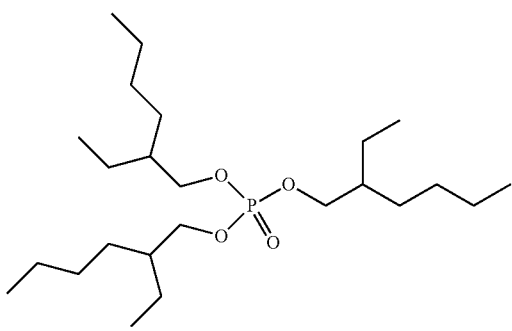 [SMILES: CCCCC(CC)COP(=O)(OCC(CC)CCCC)OCC(CC)CCCC]

TABLE 1-continued

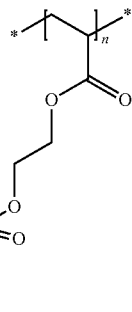

with n = 1-10000 and copolymers thereof

Other classes of photo- and thermal acid generators are iodonium salts, sulfonium salts, ferrocenium salts, sulfonyl oximes, halomethyl triazines, halomethyl-arylsulfone, α-haloacetophenones, sulfonate esters, t-butyl esters, allyl substituted phenols, t-butyl carbonates, sulfate esters, phosphate esters and phosphonate esters.

According to preferred embodiment of the invention, the colour developing agent precursor is a polymer particle, which is capable of forming an acid upon exposure to heat.

The acid liberated upon exposure to heat within the meaning of the invention includes Arrhenius acids, Brønsted-Lowry acids, and Lewis acids.

Polymer particles, which are capable of forming an acid upon exposure to heat, may have two functions:
 a colour developing agent precursor, which generates an acid upon exposure to heat, and
 a film forming binder.

The polymer particles comprise repeating units, which are capable of generating an acid upon exposure to heat. Typically, exposure to heat may cause a fragmentation reaction resulting in an acid formation. The resulting acid may be a low molecular weight molecule formed by the fragmentation reaction or the acid may reside on the polymer particle after a fragmentation reaction. Table 2 depicts (part of) polymeric acid precursors, more specific the repeating unit that is able to generate an acid upon thermal treatment.

TABLE 2

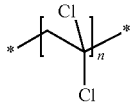

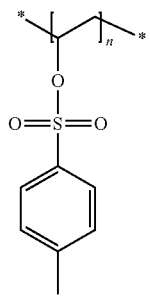

TABLE 2-continued

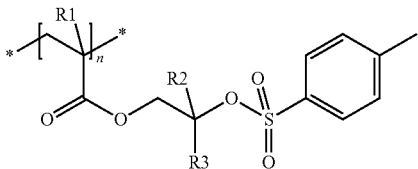

wherein R2 and R3 independently represent hydrogen or alkyl groups

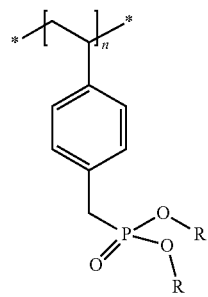

wherein R is an alkyl group, preferably a tertiary butyl group

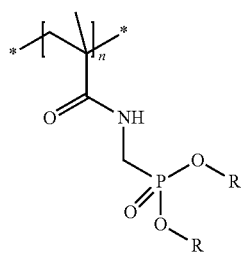

wherein R is an alkyl group, preferably a tertiary butyl group

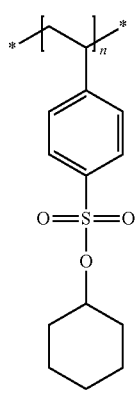

wherein R is an alkyl group, preferably a tertiary butyl group

TABLE 2-continued

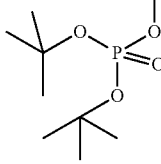

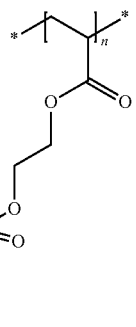

Preferred polymeric particles are capable of releasing a low molecular weight acid.

A particularly preferred polymer particle is a polyvinylidenechloride (PVDC) polymer particle. Upon exposure to heat, such a polymer particle is capable of releasing HCl.

The polyvinylidenechloride (PVDC) particle is preferably a vinylidene chloride copolymer comprising 90 wt % or less of vinylidene chloride based on the total weight of the binder.

When the amount of vinylidene chloride is above 90 wt % based on the total weight of the binder, the crystallinity of the binder becomes too high resulting in poor film forming property. Copolymerizaton of vinylidene chloride with further monomers renders the copolymer more amorphous and thus more soluble in the liquid carrier.

The vinylidene chloride copolymer preferably comprises a further monomer selected from the group consisting of vinyl chloride, alkyl acrylate, alkyl methacrylate, vinylether, vinylacetate, vinyl alcohol, acrylonitrile, methacrylonitrile, maleic acid, maleic anhydride, itaconic acid.

The vinylidene chloride copolymer more preferably comprises a further monomer selected from the group consisting of vinyl chloride, acrylonitrile, maleci acid, maleic anhydride and an alkyl acrylate.

The alkyl acrylate and alkyl methacrylate referred to above is preferably a C1-C10 alkyl acrylate or methacrylate. Particular preferred alkyl acrylates or alkyl methacrylates are methyl and butyl acrylate or methyl and butyl methacrylate.

Water based vinylidene copolymers may also be used in the present invention. Examples of such copolymers are Daran® 8730, Daran®8550, Daran®SL112, Daran®SL143, Daran®SL159 or Daran®8100, all commercially available from Owensboro Specialty Polymers; Diofan®193D, Diofan®P520, Diofan®P530 all commercially available from Solvay.

A PVDC copolymer may be characterized by the so-called dehydrochlorination constant (DHC). The amount of HCl liberated of by a specific PVDC copolymer at a specified temperature during a specific time is measured.

The amount of polymer particle in the aqueous inkjet ink is preferably between 5 and 75 wt %, more preferably between 7.5 and 50 wt %, most preferably between 10 and 40 wt %, relative to the total weight of the aqueous inkjet ink.

Opthothermal Converting Agents

An optothermal converting agent generates heat upon absorption of radiation. The optothermal converting agent preferably generates heat upon absorption of infrared radiation.

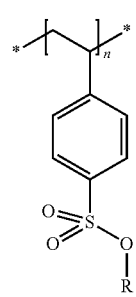

The optothermal converting agent is preferably an infrared absorbing dye, an infrared absorbing pigment, or a combination thereof.

Suitable examples of infrared dyes (IR dyes) include, but are not limited to, polymethyl indoliums, metal complex IR dyes, indocyanine green, polymethine dyes, croconium dyes, cyanine dyes, merocyanine dyes, squarylium dyes, chalcogeno-pyryloarylidene dyes, metal thiolate complex dyes, bis(chalcogenopyrylo)-polymethine dyes, oxyindolizine dyes, bis(aminoaryl)polymethine dyes, indolizine dyes, pyrylium dyes, quinoid dyes, quinone dyes, phthalocyanine dyes, naphthalo-cyanine dyes, azo dyes, (metalized) azomethine dyes and combinations thereof.

Preferred infrared absorbing dyes are polymethine dyes due to their low absorption in the visible region and their selectivity, i.e. narrow absorption peak in the infrared region. Particular preferred polymethine infrared dyes are cyanine infrared dyes.

Preferred infrared dyes having an absorption maximum of more than 1100 nm are those disclosed in EP-A 2722367, paragraphs [0044] to [0083] and the unpublished EP-A 14166498.7 (filed on 30 Apr. 2014).

Infrared dyes having an absorption maximum between 1000 nm and 1100 nm are preferably selected from the group consisting of quinoline dyes, indolenine dyes, especially a benzo[cd]indoline dye. A particularly preferred infrared dye is 5-[2,5-bis[2-[1-(1-methylbutyl)-benz[cd]indol-2(1H)-ylidene]ethylidene]-cyclopentylidene]-1-butyl-3-(2-methoxy-1-methylethyl)-2,4,6(1H,3H,5H)-pyrimidinetrione (CASRN 223717-84-8) represented by the Formula IR-1:

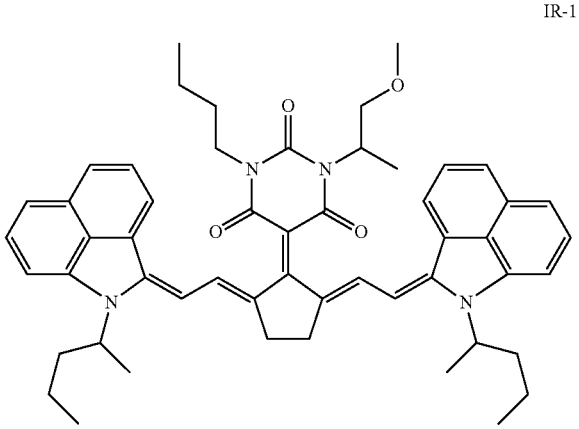 [SMILES: CCCCN1C(=O)/C(=C2C(=C\C=c3/c4cccc5cccc(c54)n3C(C)CCC)/CCC/2=C\C=c2/c3cccc4cccc(c43)n2C(C)CCC)C(=O)N(C(C)COC)C1=O]

IR-1

The infrared dye IR-1 has an absorption maximum $\Delta_{max}$ of 1052 nm making it very suitable for a Nd-YAG laser having an emission wavelength of 1064 nm.

Infrared dyes having an absorption maximum between 830 nm and 1000 nm are preferably selected from the group consisting of quinoline dyes, indolenine dyes, especially benzo[e]indolenine dyes, and benzo[f]indolenine dyes.

The amount of the IR dyes is preferably between 0.005 and 1.000 g/m², more preferably between 0.010 and 0.500 g/m², most preferably between 0.015 and 0.050 g/m². Enough IR dye has to be present to ensure sufficient colour density formation upon exposure to IR radiation. However, using too much IR dye may result in unwanted background colouration.

Water soluble infrared dyes can be added as such to the aqueous medium of the inkjet ink. However, preferred infrared dyes are often not, or slightly, soluble in aqueous media. Such infrared dyes are preferably added to the inkjet ink as an aqueous dispersion. Particularly preferred, such infrared dyes may be incorporated into the core of a capsule, for example the capsule containing the leuco dye.

Infrared Absorbing Pigments

Suitable examples of infrared absorbing pigments include but are not limited to carbon black such as acetylene black, channel black, furnace black, lamp black, and thermal black; oxides, hydroxides, sulfides, sulfates and phosphates of metals such as copper, bismuth, iron, nickel, tin, zinc, manganese, zirconium, tungsten, lanthanum, and antimony including lanthane hexaboride, indium tin oxide (ITO) and antimony tin oxide, titanium black and black iron oxide.

The infrared dye classes disclosed above may also be used as infrared absorbing pigments, for example cyanine pigment, merocyanine pigment, etc.

A preferred infrared absorbing pigment is carbon black. The particle size of the pigment is preferably from 0.01 to 5 µm, more preferably from 0.05 to 1 µm, most preferably from 0.10 to 0.5 µm.

The amount of the infrared absorbing pigment is between 10 and 1000 ppm, preferably between 25 and 750 ppm, more preferably between 50 and 500 ppm, most preferably between 100 and 250 ppm, all relative to the total dry weight of the inkjet printed image. An amount of infrared absorbing pigment above 1000 ppm results in a too high background discolouration.

Aqueous dispersions of carbon black are preferably used in a preferred embodiment of the present invention. Examples of such aqueous carbon black dispersions are CAB-O-JET® 200 and 300 from CABOT.

UV Absorbers

The aqueous inkjet ink may also include a UV-absorber. The UV-absorber may be present in the aqueous medium, covalently bound to a polymeric particle or included in the capsules.

Examples of suitable UV-absorbers include 2-hydroxyphenyl-benzophenones (BP) such as Chimassorb™ 81 and Chimassorb™ 90 from BASF; 2-(2-hydroxyphenyl)-benzotriazoles (BTZ) such as Tinuvin™ 109, Tinuvin™ 1130, Tinuvin™ 171, Tinuvin™ 326, Tinuvin™ 328, Tinuvin™ 384-2, Tinuvin™ 99-2, Tinuvin™ 900, Tinuvin™ 928, Tinuvin™ Carboprotect™, Tinuvin™ 360, Tinuvin™ 1130, Tinuvin™ 327, Tinuvin™ 350, Tinuvin™ 234 from BASF, Mixxim™ BB/100 from FAIRMOUNT, Chiguard 5530 from Chitec; 2-hydroxy-phenyl-s-triazines (HPT) such as Tinuvin™ 460, Tinuvin™ 400, Tinuvin™ 405, Tinuvin™ 477, Tinuvin™ 479, Tinuvin™ 1577 ED, Tinuvin™ 1600 from BASF, 2-(2,4-dihydroxyphenyl)-4,6-bis-(2,4-dimethylphenyl)-s-triazine (CASRN1668-53-7) from Capot Chemical Ltd and 4-[4,6-bis(2-methyl-phenoxy)-1,3,5-triazin-2-yl]-1,3-benzenediol (CASRN13413-61-1); titanium dioxide such as Solasorb 100F from from Croda Chemicals; zink oxide such as Solasorb 200F from Croda Chemicals; benzoxazines such as Cyasorb UV-3638 F, CYASORB™ UV-1164 from CYTEC; and oxamides such as Sanduvor VSU from Clariant.

Preferred UV absorbers have in the wavelength region between 300 and 400 nm a maximum absorption above 330 nm, more preferably above 350 nm.

Particular preferred UV absorbers are hydroxyphenyl benzotriazoles and 2-hydroxyphenyl-s-triazines having a maximum absorption above 350 nm in the wavelength region 300-400 nm.

Biocides

Suitable biocides for the aqueous inkjet inks include sodium dehydroacetate, 2-phenoxyethanol, sodium benzoate, sodium pyridinethion-1-oxide, ethyl p-hydroxybenzoate and 1,2-benzisothiazolin-3-one and salts thereof.

Preferred biocides are Proxel™ GXL and Proxel™ Ultra 5 available from ARCH UK BIOCIDES and Bronidox™ available from COGNIS.

A biocide is preferably added in an amount of 0.001 to 3.0 wt. %, more preferably 0.01 to 1.0 wt. %, each based on the total weight of the aqueous inkjet ink.

Humectants

Suitable humectants include triacetin, N-methyl-2-pyrrolidone, 2-pyrrolidone, glycerol, urea, thiourea, ethylene urea, alkyl urea, alkyl thiourea, dialkyl urea and dialkyl thiourea, diols, including ethanediols, propanediols, propanetriols, butanediols, pentanediols, and hexanediols; glycols, including propylene glycol, polypropylene glycol, ethylene glycol, polyethylene glycol, diethylene glycol, tetraethylene glycol, and mixtures and derivatives thereof. Preferred humectants are 2-pyrrolidone, glycerol and 1,2-hexanediol, since the latter were found to be the most effective for improving inkjet printing reliability in an industrial environment.

The humectant is preferably added to the inkjet ink formulation in an amount of 0.1 to 35 wt % of the formulation, more preferably 1 to 30 wt % of the formulation, and most preferably 3 to 25 wt % of the formulation.

pH Adjusters

The aqueous inkjet inks may contain at least one pH adjuster. Suitable pH adjusters include NaOH, KOH, NEt$_3$, NH$_3$, HCl, HNO$_3$, H$_2$SO$_4$ and (poly)alkanolamines such as triethanolamine and 2-amino-2-methyl-1-propaniol. Preferred pH adjusters are triethanol amine, NaOH and H$_2$SO$_4$.

Surfactants

The aqueous pigmented inkjet inks may contain at least one surfactant. The surfactant(s) can be anionic, cationic, non-ionic, or zwitter-ionic and are usually added in a total quantity less than 5 wt % based on the total weight of the inkjet ink and particularly in a total less than 2 wt % based on the total weight of the inkjet ink.

The one or more aqueous inkjet inks preferably have a surface tension between 18.0 and 45.0 mN/m at 25° C., more preferably between a surface tension between 21.0 and 39.0 mN/m at 25° C.

Suitable surfactants for the aqueous inkjet inks include fatty acid salts, ester salts of a higher alcohol, alkylbenzene sulfonate salts, sulfosuccinate ester salts and phosphate ester salts of a higher alcohol (for example, sodium dodecylbenzenesulfonate and sodium dioctylsulfosuccinate), ethylene oxide adducts of a higher alcohol, ethylene oxide adducts of an alkylphenol, ethylene oxide adducts of a polyhydric alcohol fatty acid ester, and acetylene glycol and ethylene oxide adducts thereof (for example, polyoxyethylene nonylphenyl ether, and SURFYNOL™ 104, 104H, 440, 465 and TG available from AIR PRODUCTS & CHEMICALS INC.).

Preferred surfactants are selected from fluoro surfactants (such as fluorinated hydrocarbons) and/or silicone surfactants.

The silicone surfactants are preferably siloxanes and can be alkoxylated, polyester modified, polyether modified, polyether modified hydroxy functional, amine modified, epoxy modified and other modifications or combinations thereof. Preferred siloxanes are polymeric, for example polydimethylsiloxanes. Preferred commercial silicone surfactants include BYK™ 333 and BYK™ UV3510 from BYK Chemie.

Particularly preferred commercial fluorosurfactants are Capstone™ FS3100 from DU PONT, Tivida™ FL2500 from MERCK and Thetawet™ FS8150 from NEOCHEM GMBH.

Inkjet Printing Methods

An inkjet printing method according to a preferred embodiment of the invention includes at least the steps of: a) jetting an image on a substrate using one or more aqueous inkjet inks as described here above; and b) applying a heat treatment to the image by direct heating or by infrared radiation.

The aqueous inkjet inks can be employed in different ways to fight counterfeiting. The main advantage is that inkjet allows variable printing, which allows to adjust the security features without having to alter the manufacturing equipment, contrary to when replacing holograms by watermarks or other security features.

The option of having visible and invisible images opens up various possibilities for incorporating security features. For example in FIG. 2.A, part of the information may be located as alphanumerical data (3) in a visible image (2), while the other part of the information is located in the invisible image (4). After delivery to the customer, the latter can inspect the authenticity by giving the invisible image (4) a heat treatment and comparing the resulting image (7) with the image (2) if it is identical. The information "XX" of image (2) together with the just revealed information "YY" of image (7) may form a code. This code can be checked e.g. on-line on the website of the manufacturer, via an app on a smart phone or against a list sent by email to the customer. If the concentration of opthothermal converting agents in the aqueous inkjet inks is often changed, it becomes very difficult for a counterfeiter to form the identical image by a sort of standardized heat treatment, especially in the case of multicolour images.

In a preferred embodiment, the inkjet printing method includes the steps of: a1) jetting a second image on the same substrate using the one or more aqueous inkjet inks described above; and b1) applying a heat treatment to the image by direct heating or by infrared radiation at a point in time which is at least 1 hour later than in step b).

In a preferred embodiment, the jetting of the image of step a) and the jetting of the second image in step a1) is performed simultaneously.

In a preferred embodiment of the inkjet printing method, the image and the second image are identical after heat treatment.

In a preferred embodiment of the inkjet printing method, the image and the second image are identical after heat treatment with the exception of alphanumerical date contained in the image and the second image.

Heat Treatment

After jetting an image on a substrate using one or more aqueous inkjet inks according to the invention, a heat treatment is applied to the image by direct heating or by infrared radiation.

In a direct heat treatment, the heat is applied by heat conduction or convection. In an indirect heat treatment, an optothermal converting agent absorbs infrared radiation and converts that radiation into heat.

If an invisible image (4) is present on e.g. a pharmaceutical packaging, the authenticity thereof can be verified by pressing a hot stamp against the invisible image (4). This heat treatment causes a colour formation whereby the invisible image (4) becomes a visible image (7). This visible image (7) can, for example, be compared to an inkjet printed image (2) which already received a heat treatment upon manufacturing (see FIG. 1).

Images

In a preferred embodiment of the present invention, an image may contain graphical data and/or information. The term "graphical data" means any graphical representation, e.g. a picture, a drawing, a logo, etc. The term "information" means any alphanumeric data, e.g. text, a name, a code, etc.

The image can be invisible. This is the case when the image has been inkjet printed, but has not yet received a heat treatment. After receiving a heat treatment, the image becomes visible.

The image can be in a single colour or can contain a plurality of colours.

There is no limitation on the size of the image. It can be e.g. less than a 1 cm$^2$ for authentication purposes or e.g. 2 m×3 m for a billboard.

Inkjet Printing Devices

The aqueous inkjet inks may be jetted by one or more print heads ejecting small droplets of ink in a controlled manner through nozzles onto an ink-receiver surface, which is moving relative to the print head(s).

A preferred print head for the inkjet printing system is a piezoelectric head. Piezoelectric inkjet printing is based on the movement of a piezoelectric ceramic transducer when a voltage is applied thereto. The application of a voltage changes the shape of the piezoelectric ceramic transducer in the print head creating a void, which is then filled with ink. When the voltage is again removed, the ceramic expands to its original shape, ejecting a drop of ink from the print head. However the inkjet printing method according to the present invention is not restricted to piezoelectric inkjet printing. Other inkjet print heads can be used and include various types, such as a continuous type and thermal, electrostatic and acoustic drop on demand type.

The inkjet print head normally scans back and forth in a transversal direction across the moving ink-receiver surface. Often the inkjet print head does not print on the way back. Bi-directional printing is preferred for obtaining a high areal throughput.

For printing on packaging applications and for marking and codiung applications, the preferred inkjet printing method is by a "single pass printing process", which can be performed by using page wide inkjet print heads or multiple staggered inkjet print heads which cover the entire width of the ink-receiver surface. In a single pass printing process the inkjet print heads usually remain stationary and the substrate surface is transported under the inkjet print heads.

Drying Devices

The inkjet printer contains a drying device for removing water and organic solvents in the inkjet printed image.

Suitable drying devices include devices circulating hot air, ovens, and devices using air suction.

A pre-heating device may be included in the inkjet printing device for heating the substrate prior to jetting. The pre-heating device may be an infrared radiation source as described here below, or may be a heat conduction device, such as a hot plate or a heat drum. A preferred heat drum is an induction heat drum.

A preferred pre-heating device uses Carbon Infrared Radiation (CIR) to heat the outside of the substrate quickly. Another preferred drying device is a NIR source emitting near infrared radiation. NIR-radiation energy quickly enters into the depth of the inkjet ink layer and removes water and solvents out of the whole layer thickness, while conventional infrared and thermo-air energy predominantly is absorbed at the surface and slowly conducted into the ink layer, which results usually in a slower removal of water and solvents.

The drying device may be, at least in part, arranged in combination with the print head of the inkjet printer, travelling therewith so that the radiation is applied very shortly after jetting. In such a case, the inkjet printer is preferably equipped with some kind of infrared radiation source, e.g. an infrared light source, such as an infrared laser, one or more infrared laser diodes or infrared LEDs.

A preferred effective infrared radiation source has an emission maximum between 0.8 and 1.5 µm. Such an infrared radiation source is sometimes called a NIR radiation source or NIR dryer. In a preferred form the NIR radiation source is in the form of NIR LEDs, which can be mounted easily on a shuttling system of a plurality of inkjet print heads in a multi-pass inkjet printing device.

The skilled person knows that he should control the infrared radiation of the drying device in such a manner that the ink layer is dried, but no colour formation is started.

Packaging

There is no real limitation on the type of substrate. The substrates may have wood, paper or polymeric surfaces for printing. The substrate may also be primed, e.g. by a white primer or ink. However, the advantages of the aqueous inkjet inks of the invention can be especially advantageously used on substrates for food packaging or pharmaceuticals. Food packaging is understood to include also packaging for liquids and drinks like milk, water, coke, beer, vegetable oil and the like.

The invention is advantageously used for providing food packaging, especially "primary" food packaging. Primary food packaging is the material that first envelops the product and holds it. This usually is the smallest unit of distribution or use and is the package which is in direct contact with the contents. Of course, for reasons of food safety, the inkjet inks may also be used for secondary and tertiary packaging. Secondary packaging is outside the primary packaging, perhaps used to group primary packages together. Tertiary packaging is used for bulk handling, warehouse storage and transport shipping. The most common form of tertiary packaging is a palletized unit load that packs tightly into containers.

The substrate may be porous, as e.g. textile, paper and card board substrates, or substantially non-absorbing substrates such as e.g. a plastic substrate having a polyethylene terephthalate surface.

Preferred substrates including surfaces of polyethylene, polypropylene, polycarbonate, polyvinyl chloride, polyesters like polyethylene terephthalate (PET), polyethylene naphthalate (PEN) and polylactide (PLA) and polyimide.

The substrate may also be a paper substrate, such as plain paper or resin coated paper, e.g. polyethylene or polypropylene coated paper. There is no real limitation on the type of paper and it includes newsprint paper, magazine paper, office paper, wallpaper but also paper of higher grammage, usually referred to as boards, such as white lined chipboard, corrugated board and packaging board.

The substrates may be transparent, translucent or opaque. Preferred opaque substrates includes so-called synthetic paper, like the Synaps™ grades from Agfa-Gevaert which are an opaque polyethylene terephthalate sheet having a density of 1.10 g/cm³ or more.

There is no restriction on the shape of the substrate. It can be a flat sheet, such a paper sheet or a polymeric film or it can be a three dimensional object like e.g. a plastic coffee cup. The three dimensional object can also be a container like a bottle or a jerry-can for including e.g. oil, shampoo, insecticides, pesticides, solvents, paint thinner or other type of liquids.

In a preferred embodiment, the substrate is a packaging, more preferably a food packaging, such as a wrapping for a chocolate bar.

EXAMPLES

Materials

All materials used in the following examples were readily available from standard sources such as Aldrich Chemical Co. (Belgium) and Acros (Belgium) unless otherwise specified. The water used in the examples is demineralized water.

SDS™ Ultra Pure is Sodium dodecyl sulfate commercially available from AppliChem GmbH.

LD-1 is Wincon™ 205, a black leuco dye supplied by Connect Chemicals, having the following structure:

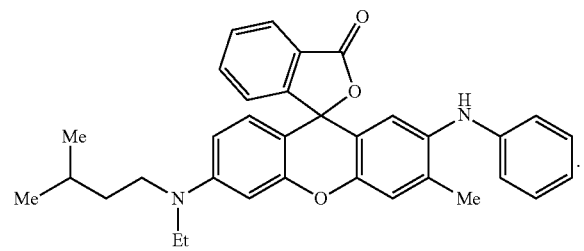 [SMILES: CCN(CCC(C)C)c1ccc2c(c1)Oc1cc(C)c(Nc3ccccc3)cc1C21OC(=O)c2ccccc21]

LD-2 is Pergascript™ Black IR, a black leuco dye supplied by BASF, having the following structure:

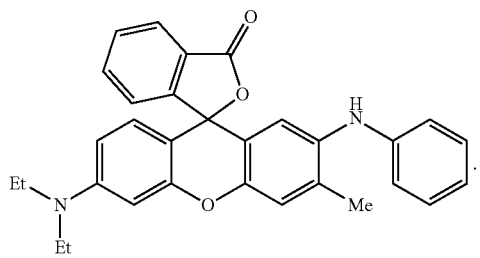 [SMILES: CCN(CC)c1ccc2c(c1)Oc1cc(C)c(Nc3ccccc3)cc1C21OC(=O)c2ccccc21]

LD-3 is Pergascript™ black 2C, a black leuco dye supplied by BASF, having the following structure:

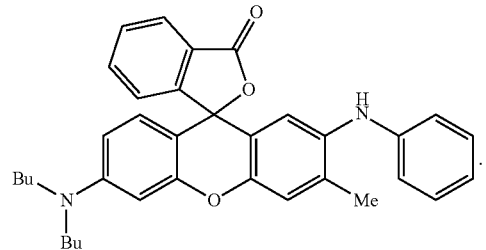

LD-4 is a red leuco dye supplied by Molekula Fine Chemicals, having the following structure:

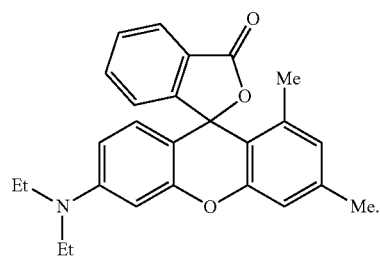 [SMILES: CCN(CC)c1ccc2c(c1)Oc1cc(C)cc(C)c1C21OC(=O)c2ccccc21]

LD-5 is Mitsui™ GN169, a blue leuco dye supplied by Mitsui, having the following structure:

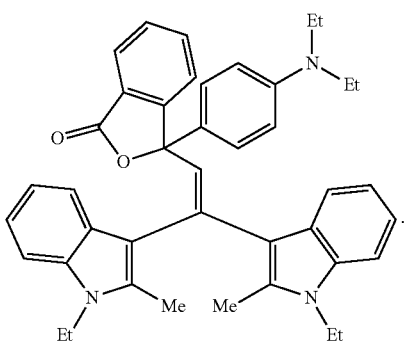 [SMILES: CCN(CC)c1ccc(C2(C=C(c3c(C)n(CC)c4ccccc34)c3c(C)n(CC)c4ccccc34)OC(=O)c3ccccc32)cc1]

LD-6 is Mitsui G2, a cyan leuco dye supplied by Mitsui, having the following structure:

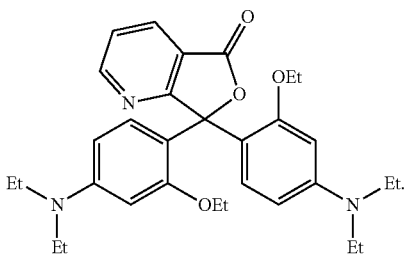 [SMILES: CCOc1cc(N(CC)CC)ccc1C1(c2ccc(N(CC)CC)cc2OCC)OC(=O)c2cccnc21]

LD-7 is Wincon™ Red, a leucodye (CASRN 50292-95-0) commercially available from Connect Chemicals.

LD-01 is a leuco dye prepared according to the following scheme:

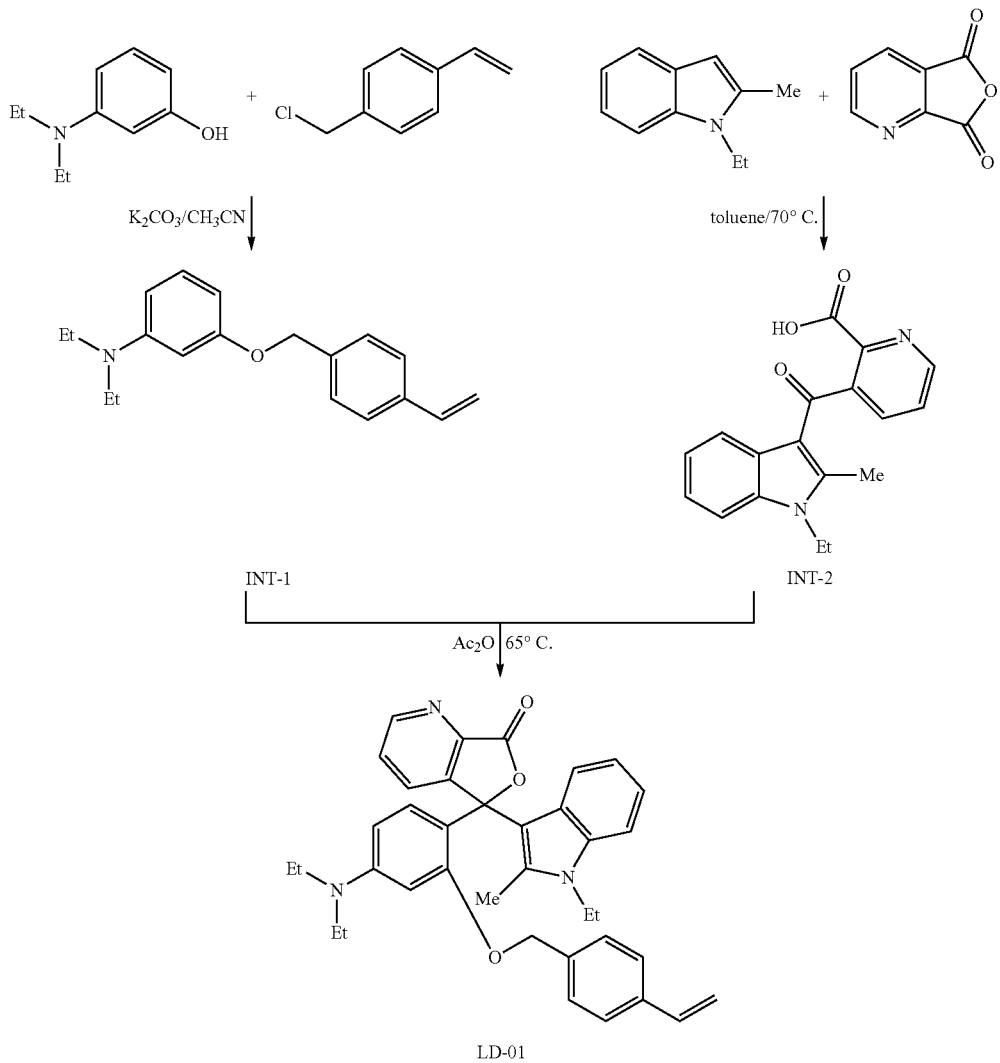

LD-01

Synthesis of Diethyl-[3-(4-vinyl-benzyloxy)-phenyl]-amine (INT-1)

10 g (63 mmol) 3-diethylamino-phenol was dissolved in 100 ml acetonitrile. 29.5 g (0.189 mol) potassium carbonate was added followed by the addition of 10.6 g (63 mmol) 4-chloromethyl-styrene. The mixture was heated to reflux for 9 hours. An additional 500 µl 4-chloromethyl-styrene was added and the reaction was allowed to continue for an additional one and a half hour. The reaction mixture was allowed to cool down to room temperature and the solvent was removed under reduced pressure. The residue was recrystallized twice from isopropanol. 7.5 g of diethyl-[3-(4-vinyl-benzyloxy)-phenyl]-amine was isolated (yield: 42%).

Synthesis of 3-(1-Ethyl-2-methyl-1H-indole-3-carbonyl)-pyridine-2-carboxylic acid (INT-2)

7.4 g (50 mmol) furo[3,4-b]pyridine-5,7-dione was added to 50 ml toluene. 8.2 g (50 mmol) 1-ethyl-2-methyl-1H-indole was added dropwise and the mixture was heated to 74° C. The reaction was allowed to continue for five hours at 70° C. The reaction mixture was allowed to cool down to room temperature and the precipitated crude 3-(1-ethyl-2-methyl-1H-indole-3-carbonyl)-pyridine-2-carboxylic acid was isolated by filtration. The crude 3-(1-ethyl-2-methyl-1H-indole-3-carbonyl)-pyridine-2-carboxylic acid was recrystallized from isopropanol. 7.5 g of 3-(1-ethyl-2-methyl-1H-indole-3-carbonyl)-pyridine-2-carboxylic acid was isolated (yield: 50%).

Synthesis of LD-01

7 g (23 mmol) 3-(1-ethyl-2-methyl-1H-indole-3-carbonyl)-pyridine-2-carboxylic acid was dissolved in 100 ml acetic anhydride. 6.5 g (23 mmol) diethyl-[3-(4-vinyl-benzyloxy)-phenyl]-amine was added and the reaction was allowed to continue for 16 hours at 65° C. The reaction mixture was allowed to cool down to room temperature. Leuco dye monomer LD-01 was isolated by filtration washed with 100 ml water and dried. 9 g of leuco dye monomer-1 was isolated (yield: 69%).

LD-02 is a leuco dye prepared according to the following scheme:

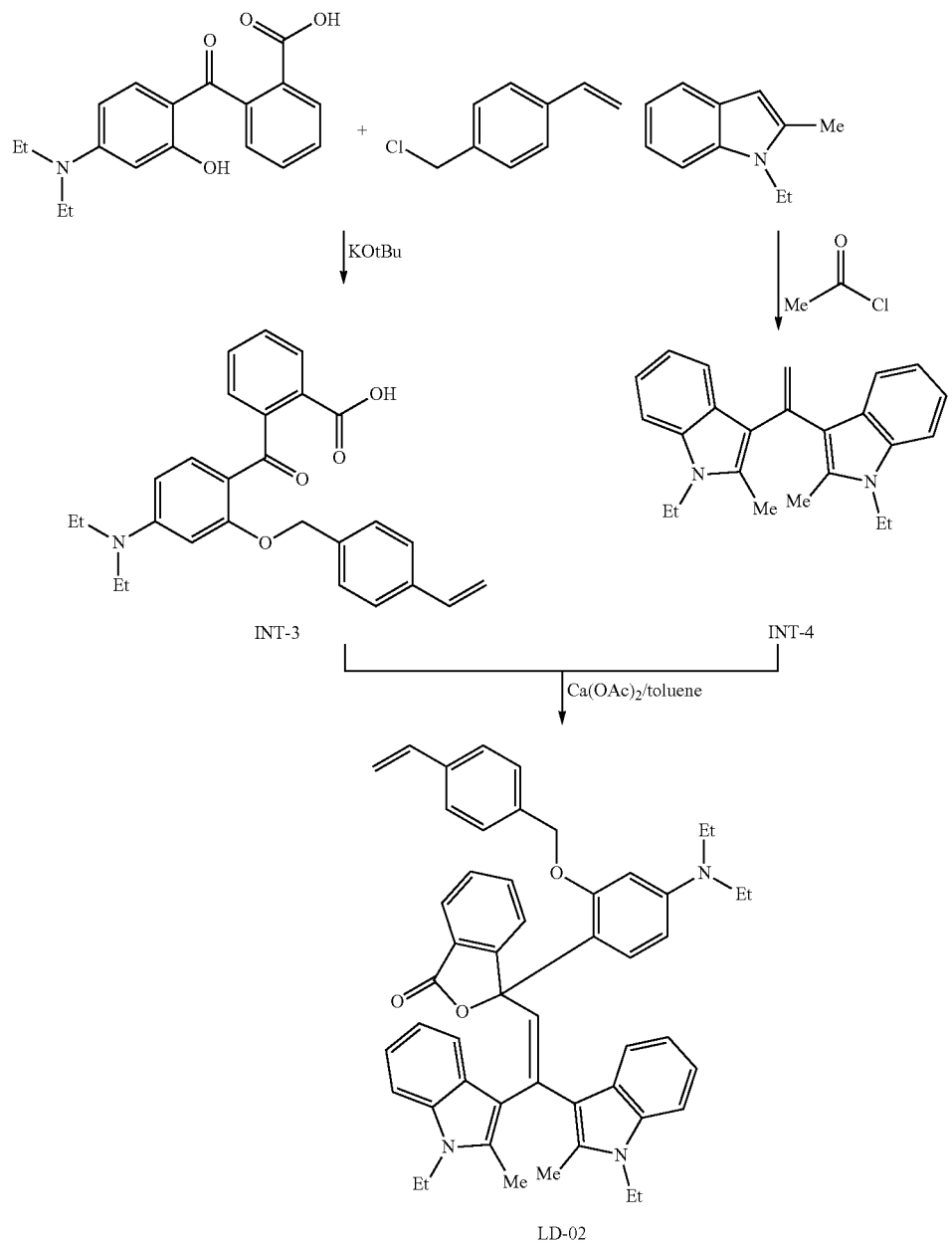

LD-02

Synthesis of 2-[4-Diethylamino-2-(4-vinyl-benzyloxy)-benzoyl]-benzoic acid (INT-3)

31.3 g (0.1 mol) 2-(4-diethylamino-2-hydroxy-benzoyl)-benzoic acid was dissolved in 300 ml dimethylacetamide. 23.0 g (0.204 mol) potassium tert.-butanolate was added and the mixture was stirred until complete dissolution. 32 g (0.21 mol) 4-chloromethyl-styrene was added and the mixture was heated to 70° C. for two hours. The reaction mixture was allowed to cool down to 40° C. and the mixture was added to 1.5 litre water. The precipitated product was isolated and redissolved in 300 ml methanol. 25 ml of a 5N NaOH solution was added and the mixture was heated to reflux for 3 hours. 500 ml water was slowly added and the mixture was allowed to cool down to 40° C. 25 ml acetic acid was added. The crude 2-[4-diethylamino-2-(4-vinyl-benzyloxy)-benzoyl]-benzoic acid precipitated from the medium, was isolated by filtration and washed with water. The crude 2-[4-diethylamino-2-(4-vinyl-benzyloxy)-benzoyl]-benzoic acid was dissolved in 300 ml methanol and precipitated with 1.5 litre water. 2-[4-Diethylamino-2-(4-vinyl-benzyloxy)-benzoyl]-benzoic acid was isolated by filtration and dried. The dried 2-[4-diethylamino-2-(4-vinyl-benzyloxy)-benzoyl]-benzoic acid was dissolved in 200 ml ethylacetate upon reflux. 600 ml hexane was added and the mixture was allowed to cool down to room temperature. 2-[4-Diethylamino-2-(4-vinyl-benzyloxy)-benzoyl]-benzoic acid was isolated by filtration and dried. 23 g of 2-[4-diethylamino-2-(4-vinyl-benzyloxy)-benzoyl]-benzoic acid was isolated (yield: 53%).

Synthesis of 1-Ethyl-2-methyl-3-[1-(1-ethyl-2-methyl-1H-indol-3-yl)-vinyl]-1H-indole (INT-4)

8.0 g (50 mmol) 1-ethyl-2-methyl-1H-indole was dissolved in 7.5 ml acetic anhydride. 1.97 g (25 mmol) acetyl chloride was added and the reaction was allowed to continue at 55° C. for four hours. The reaction mixture was directly used further without further purification.

Synthesis of leuco dye monomer LD-02

To the reaction mixture of step 2, 13 ml toluene was added, followed by the addition of 4.4 g (25 mmol) calcium acetate hydrate and 10.8 g (25 mmol) 2-[4-diethylamino-2-(4-vinyl-benzyloxy)-benzoyl]-benzoic acid. The reaction was allowed to continue for two hours at 60° C. The reaction mixture as allowed to cool down to room temperature. 300 ml toluene, 200 ml water and 19 g of a 10 N NaOH solution were added. The mixture was stirred for 30 minutes at 60° C. The toluene fraction was isolated, washed with 300 ml water, dried over $MgSO_4$ and evaporated under reduced pressure. The crude leuco dye monomer-2 was isolated by preparative column chromatography on a Graceresolv RS80 column, using a gradient elution from 100% methylene chloride to methylene chloride/ethyl acetate 80/20. 8 g of leuco dye monomer-2 was isolated (yield: 46%).

LD-DISP-01 is a dispersion of the leuco dye LD-04 and was prepared as follows:

100 g LD-04, 200 g of a 5 wt % solution of Aerosol OT-100 in water and 2 g of a 5 wt % solution of 1,2-benzisothiazol-3(2H)-one, potassium salt in water were mixed into 198 g water using a DISPERLUX™ dispenser. Stirring was continued for 30 minutes. The vessel was connected to a NETZSCH MiniZeta mill filled with 900 g of 0.4 mm yttrium stabilized zirconia beads ("high wear resistant zirconia grinding media" from TOSOH Co.). The mixture was circulated over the mill for 67 minutes (residence time of 20 minutes) and a rotation speed in the mill of about 10.4 m/s. During the complete milling procedure the content in the mill was cooled to keep the temperature below 60° C. After milling, the dispersion was discharged into a vessel. The resulting concentrated dispersion exhibited an average particle size of 193 nm as measured with a Malvern™ nano-S and a viscosity of 5 mPa·s at 25° C. and at a shear rate of 10 $s^{-1}$.

LD-DISP-02 is a dispersion of the leuco dye LD-07 and was prepared as follows:

10 g LD-0-7, 20 g of a 5 wt % solution of Aerosol OT-100 in water, 0.375 g of a 8 wt % solution of sodium hydroxide in water and 0.2 g of a 5 wt % solution of 1,2-benzisothiazol-3(2H)-one, potassium salt in water were mixed into 19.425 g water and introduced into a 100 mL plastic container. The container was filed with 160 g of 3 mm yttrium stabilized zirconia beads ("high wear resistant zirconia grinding media" from TOSOH Co.). The container was sealed and placed on rotating rolls for 7 days. After roll milling, the dispersion exhibited an average particle size of 265 nm as measured with a Malvern™ nano-S.

CCE is Hydran APX-101H, a polyester urethane (45%) from DIC.

Resorcinol is commercially available from Sumitomo Chemicals.

Par is a dimethyltrimethylolamine formaldehyde resin from Cytec industries.

PAR-sol is a 40 wt % aqueous solution of Par.

PEA is Tospearl™ 120 from Momentive Performance Materials.

PEA-sol is a 10 wt % (50/50) aqueous/ethanol dispersion of PEA.

Dowfax™ 2A1 from Pilot Chemicals C is a Alkyldiphenyloxide disulfonate (4.5% wt).

DOW-sol is a 2.5 wt % solution of Dowfax™ 2A1 in isopropanol.

Surfynol™ 420 from Air Products is a non ionic surfactant.

Surfynsol is a 2.5 wt % solution of Surfynol™ 420 in isopropanol.

Sunvac™ HH is a copolymer of 86 wt % vinyl chloride and 14 wt % vinyl acetate provided by Yantal Suny Chem International Co., Ltd, China.

Tospearl™ 145 is available from Momentive Performance materials.

Tinogard™ AS, a UV absorber commercially available from BASF.

PET-C is polyethylenterephtalate substrate prepared as follows:

first a coating composition SUB-1 was prepared by mixing the components according to the following Table 3.

TABLE 3

| wt % of components | SUB-1 |
| --- | --- |
| water | 69.44 |
| CCE | 15.40 |
| Resorcinol | 12.55 |
| PAR-sol | 0.57 |
| PEA-sol | 0.68 |
| DOW-sol | 0.68 |
| Surfynsol | 0.68 |

A 1100 μm thick polyethylene terephthalate sheet was first longitudinally stretched and then coated on both sides with the coating composition SUB-1 at a wet coating thickness of 10 μm. After drying, the longitudinally stretched and coated polyethylene terephthalate sheet was transversally stretched to produce a double side subbed 63 μm thick sheet PET-C, which was transparent and glossy. Then an outer layer was prepared by coating the coating solution OUT-1 shown in Table 4 on one side of the PET-C foil at a wet coating thickness of 30 μm and dried at 90° C. during 6 minutes.

TABLE 4

| Ingredient (g) | OUT-1 |
| --- | --- |
| MEK | 87.85 |
| Sunvac ™ HH | 10.60 |
| Tospearl ™ 145 | 0.02 |
| Tinogard ™ AS | 1.50 |

Takenate™ D110N is a trifunctional isocyanate, supplied by Mitsui.

Tinuvin™ 928 is a UV absorber supplied by BASF, having the following structure:

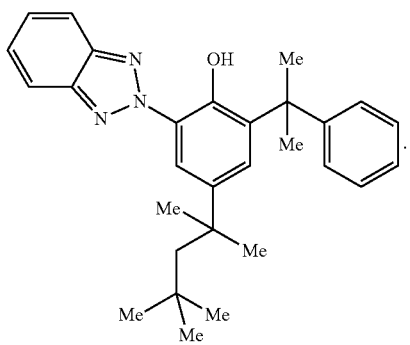 [SMILES: CC(C)(C)CC(C)(C)c1cc(-n2nc3ccccc3n2)c(O)c(C(C)(C)c2ccccc2)c1]

Olfine™ E1010 was supplied by Nissin Chemicals.

Bykjet™ 9152 is a polymer dispersing agent supplied by BYK.

IR-1 is an infrared dye, having the following structure

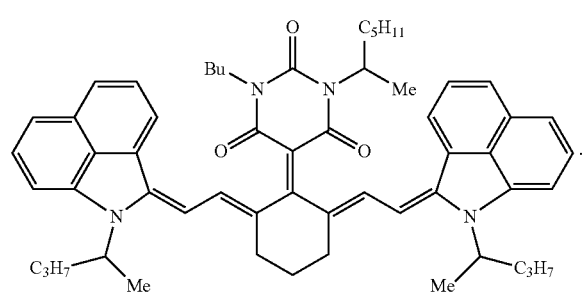

The infrared dye IR-1 was prepared according to the synthetic methodology, disclosed in EP 2463109 A (AGFA).

DEV-1 is a zinc salicylate complex supplied by Sanko Chemicals Europe, having the following structure:

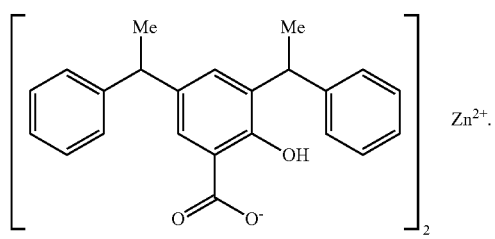

DEV-2 is a bisphenol compound supplied by TCI Europe, having the following structure:

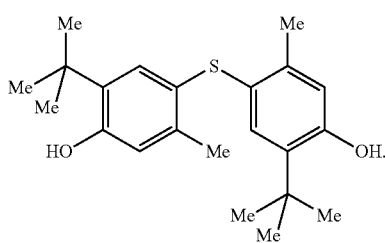 [SMILES: Cc1cc(O)c(C(C)(C)C)cc1Sc1cc(C(C)(C)C)c(O)cc1C]

DEV-3 is Lowinox™ 22M46, supplied by Chemtura, having the following structure:

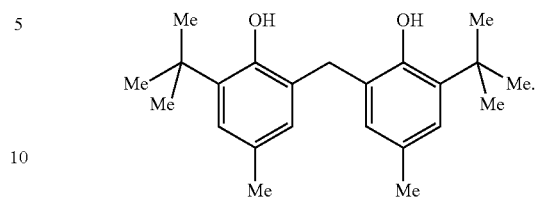

Mowiol™ 488 is a polyvinyl alcohol supplied by Hoechst.

Marlon™ A365 is an anionic surfactant supplied by Sasol.

Tricresyl phosphate was supplied by Lanxess.

Proxel™ Ultra 5 is a biocide supplied by Avecia.

Alkanol™ XC is an anionic surfactant, supplied by Dupont.

CB-01, is Cab-O-Jet 300, a carbon black dispersion from CABOT CORPORATION, 300 times diluted.

Daran™ 8100, is a vinylidene copolymer-methyl acrylate polymer dispersion in water (60 wt %), commercially available from OWENSBORO SPECIALTY POLYMERS.

Buffer (pH 9) is a phosphatebuffer (0.25M $NaH_2PO_4$).

DR306 is a surfactant solution according to Table 5

TABLE 5

| g of component | DR306 |
|---|---|
| Chemguard ™ S228 | 52.6 |
| Chemguard ™ S550 | 52.6 |
| Isopropanol | 473.0 |
| water | 431.0 |

Chemguard™ S228 is a blend of fluoro/silicone surfactants from CHEMGUARD INC.

Chemguard™ S550 is a short-chain perfluoro-based ethoxylated nonionic fluorosurfactant from CHEMGUARD INC.

Measurement Methods

1. Average Particle Size

Unless otherwise specified, the average particle size was measured using a Brookhaven BI-90 Particle sizer.

2. Viscosity

The viscosity of the inkjet ink was measured using a Brookfield DV-II+ viscometer at 25° C. at 12 rotations per minute (RPM) using a CPE 40 spindle. This corresponds to a shear rate of 90 $s^{-1}$.

3. Surface Tension

The static surface tension of the radiation curable inks was measured with a KRUSS tensiometer K9 from KRUSS GmbH, Germany at 25° C. after 60 seconds.

Example 1

This example illustrates an aqueous inkjet ink wherein the immobilized leuco dye is covalently bonded to polymeric particles.

Preparation Immobilized Leuco Dyes LX-01 and LX-02

A polymer emulsion was prepared by means of a seeded emulsion polymerisation, wherein part of the monomers were brought into the reactor together with the surfactant before any initiator was added. All surfactant (3.5% relative to the total monomer amount) was added to the reactor before the reaction was started.

In a double-jacketed reactor of 700 ml, 1.12 gram SDS™ Ultra Pure and 206.39 gram of water was added. The reactor was put under an inert atmosphere by flushing with nitrogen. The reactor was then heated to 75° C. The monomer mixture used for preparing the seed was weighed in a dropping funnel, i.e. 1.06 gram of styrene, and 0.54 gram of acrylonitrile. When the surfactant solution reached 75° C., the seed monomer mixture was added instantaneously. The reactor was then heated for 15 minutes at 75° C. Subsequently 5.27 gram of a 2% aqueous solution of sodium persulfate was added (50% of the total initiator amount). Subsequently the reactor was heated during 30 minutes to 80° C. When the reactor reached 80° C., the monomer and initiator dosage was started. The monomer mixture of 19.92 gram of styrene and 8.83 gram of acrylonitrile and 1.6 gram of LD-01 was added during 3 hours. Simultaneously during the monomer addition, an aqueous persulfate solution was added (5.27 gram of a 2% aqueous solution of sodium persulfate). After the monomer dosing had finished, the reactor was kept at 80° C. for 1 hour. Residual monomer was removed by vacuum distillation for 1 hour at 80° C. and then the reactor was cooled to 20° C. The product was filtered using a 5 micron filter, resulting in the immobilized leuco dye dispersion LX-01 having a solid content of 12.1%, a pH of 4.6 and an average particle size of 37 nm.

LX-02 was prepared in the same manner as LX-01 except that LD-02 was used instead of LD-01. LX-02 had a solid content of 11.8%, a pH of 4.38 and an average particle size of 35 nm.

Preparation Aqueous Inkjet Inks

The immobilized leuco dyes LX-01 and LX-02 and the colour developing agent precursor Daran™ 8100 were used to formulate the inventive aqueous inkjet ink INV-1 and INV-2 according to Table 6. The leuco dye dispersions LD-DISP-01 and LD-DISP-02 used to prepare the immobilized leuco dyes LX-01 and LX-02 were used to formulate a comparative aqueous inkjet ink COMP-1 according to Table 6.

TABLE 6

| g of component | COMP-1 | INV-1 | INV-2 |
| --- | --- | --- | --- |
| water | 9.40 | — | — |
| Buffer (pH 9) | 5.00 | — | — |
| Daran ™ 8100 | 19.50 | 18.00 | 18.00 |
| NaOH (81 g/L) | 0.20 | 0.30 | 0.40 |
| LD-DISP-01 | 7.60 | — | — |
| LD-DISP-02 | 1.00 | — | — |
| LX-01 | — | 80.00 | — |
| LX-02 | — | — | 80.00 |
| CB-01 | 5.50 | 0.46 | 0.46 |
| DR306 | 2.00 | 1.00 | 1.00 |

The aqueous inkjet inks were then coated on the side of the PET-C foil provided with SUB-1 layer at a wet coating thickness of 30 μm and dried at 90° C. during 6 minutes. The obtained coated samples were then laminated on both sides of a 600 μm PETG CORE (from Wolfen) using an OASYS OLA 6H laminator (130° C.—220 sec).

Evaluation and Results

The laminated samples were then laser marked using a Muehlbauer™ CL 54 equipped with a Rofin™ RSM Powerline™ E laser (10 W) (1064 nm, 35 kHz).

The optical density of the laser marked areas were measured in reflection using a spectrodensitometer type Gretag™ Macbeth™ SPM50 using a visual filter.

To test the UV stability, the laminated samples were kept in a weathering cabinet equipped with a Xenon lamp for 72 hours after which the increase of the background density (ΔDmin) is measured.

The maximum optical densities (ODmax), the background optical densities (ODmin) and the increase of the background density upon UV exposure are shown in Table 7.

TABLE 7

| Sample | ODmax | ODmin | ΔDmin |
| --- | --- | --- | --- |
| COMP-1 | 1.8 | 0.1 | >1.0 |
| INV-1 | 1.2 | 0.1 | 0.1 |
| INV-2 | 1.3 | 0.2 | 0.0 |

From Table 7, it can be seen that all samples have the desired maximum optical density higher than 1.0, but only the samples prepared with the inventive aqueous inkjet ink INV-1 and INV-2 exhibited excellent UV stability.

Example 2

This example illustrates an aqueous inkjet ink wherein the immobilized leuco dye is included in the core of capsules composed of a polymeric shell surrounding a core.

Preparation of Capsules CAPS-1

5 g of LD-1, 1.2 g of LD-2, 3 g of LD-3, 4.9 g of LD-4, 4.9 g of LD-5, 2.4 g of LD-6 and 2.1 g of Tinuvin™ 928 were dissolved in 32 ml ethyl acetate by heating until reflux. The mixture was allowed to cool down to 60° C. and 23.1 g Takenate™ D110N and a solution of 50 mg of IR-1 in 2 ml methylene chloride were added. The mixture was allowed to cool down to room temperature. In a separate vessel, a solution of 8 g Bykjet™ 9152 and 0.12 g Olfine™ E1010 was prepared. This ethyl acetate solution was added to the aqueous solution under high shear, using a T25 digital Ultra-Turrax with an 18N rotor available from IKA at 24000 rpm for 5 minutes. The ethyl acetate was removed under reduced pressure, followed by removal of 20 g water to completely remove residual ethyl acetate. 20 ml water was added and the mixture was heated to 50° C. for 16 hours. After cooling down to room temperature, the mixture was filtered over a 1 μm filter. The average capsule size was estimated using an optical microscope to be about 400 nm.

Preparation of Colour Developing Agent CDA-1

A solution of 9.75 g DEV-2, 9.75 g DEV-3, 30 g Tinuvin™ 928, 7.5 g tricresyl phosphate, 3.75 g diethyl maleate and 165 g DEV-1 in 450 g ethyl acetate was prepared by heating to 50° C.

In a separate vessel, a solution of 50 Mowiol™ 488, 7.5 g Marlon™ A365 and 4 g Proxel™ Ultra 5 in 715 ml water was prepared. The ethyl acetate solution was added to the aqueous solution using a HOMO-REX high speed homogenizing mixer. The mixture was stirred further for 5 minutes followed by removal of the ethyl acetate under reduced pressure. The particle size was measured using a Malvern nano-S. CDA-1 had an average particle size of 207 nm.

Preparation Aqueous Inkjet Ink INV-3

The immobilized leuco dye CAPS-1 and the colour developing agent CDA-1 were used to formulate the inventive aqueous inkjet ink INV-3 according to Table 8. All weight percentages (wt %) are based on the total weight of the inkjet ink.

TABLE 8

| w % of component | INV-3 |
| --- | --- |
| CDA-1 | 6.77 |
| CAP-1 | 3.82 |
| Glycerol | 42.16 |
| Alkanol ™ XC | 1.00 |
| water | 46.25 |

The ink was filtered over a 1.6 μm filter. The ink had a surface tension of 30 mN/m and a viscosity of 10 mPas at 22° C.

The inventive ink jet ink INV-3 was jetted using a Dimatix™ DMP2831 system, equipped with a standard Dimatix™ 10 pl print head. The inks were jetted at 22° C., using a firing frequency of 15 kHz, a firing voltage of 25 V and a standard waveform on a paper substrate to form a uniform square of 7 cm×7 cm, i.e. an invisible image (9). An additional square was printed on an Agfajet™ Transparency Film, supplied by Agfa.

An optically pumped semiconductor laser emitting at 1064 nm (Genesis MX 1064-10000 MTM from COHERENT) was used for producing a black wedge of 0.6 cm×0.6 cm square boxes of increasing optical density in the squares inkjet printed on both substrates. The laser was used at a power level of 4 W measured at the sample, a dither of 0.025, a scan speed of 200 mm/s and at a pulse repetition rate of 10 kHz.

A black wedge, i.e. a visible image (7), was laser marked in both inkjet printed squares.

REFERENCE SIGNS LIST

TABLE 9

| 1 | Packaging |
| --- | --- |
| 2 | Image |
| 3 | Alphanumerical data |
| 4 | Second Image |
| 5 | Heat treatment |
| 6 | Alphanumerical data |
| 7 | Visible Image |
| 8 | Inkjet printing |
| 9 | Invisible image |
| 10 | Heat treatment |
| 11 | Transport |
| 12 | Inspection |
| 13 | Magnifying glass |

The invention claimed is:

1. An aqueous inkjet ink comprising:
an immobilized leuco dye;
a color developing agent or a color developing agent precursor; and
an optothermal converting agent; wherein
the leuco dye is immobilized by being covalently bonded to polymeric particles or by being included in a core of capsules including a polymeric shell surrounding the core;
the immobilized leuco dye is physically separated from the color developing agent or the color developing agent precursor by the polymeric shell of the capsule; and
the aqueous inkjet ink has a viscosity less than 50 mPa·s at 25° C. and a shear rate of 90 s$^{-1}$.

2. The aqueous inkjet ink according to claim 1, wherein the optothermal converting agent is selected from the group consisting of an infrared dye and carbon black.

3. The aqueous inkjet ink according to claim 1, wherein the color developing agent precursor includes a polymer particle that generates an acid upon exposure to heat.

4. The aqueous inkjet ink according to claim 3, wherein the polymer particle include a vinylidene chloride copolymer particle.

5. The aqueous inkjet ink according to claim 1, wherein the color developing agent precursor is represented by Formula (I) or Formula (II):

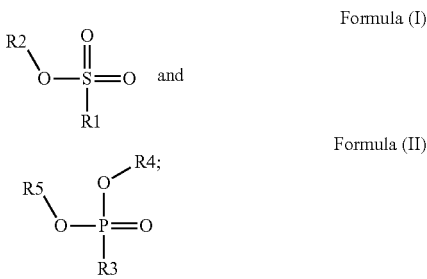

wherein
R1 and R3 independently represent an optionally substituted alkyl group, an optionally substituted (hetero) cyclic alkyl group, an optionally substituted (hetero) aryl group, an optionally substituted aralkyl group, an optionally substituted alkoxy group, an optionally substituted (hetero)cyclic alkoxy group, or an optionally substituted (hetero)aryl group;
R2, R4, and R5 independently represent an optionally substituted alkyl, an optionally substituted aliphatic (hetero)cyclic alkyl group, or an optionally substituted aralkyl group; and
R1 and R2, R4 and R5, R3 and R4, and R3 and R5 may represent necessary atoms to form a ring.

6. An aqueous inkjet ink set comprising:
two or more of the aqueous inkjet ink according to claim 1; wherein
the aqueous inkjet inks include different leuco dyes or a same leuco dye in different amounts.

7. A packaging comprising:
an image defined by the aqueous inkjet ink according to claim 1.

8. The packaging according to claim 7, wherein the packaging is selected from the group consisting of food packaging and pharmaceutical packaging.

9. An inkjet printing method comprising the steps of:
a) jetting an image on a first substrate using one or more of the aqueous inkjet ink according to claim 1; and
b) applying a heat treatment to the image by direct heating or by infrared radiation.

10. The inkjet printing method according to claim 9, further comprising the steps of:
a1) jetting a second image on the first substrate using the one or more aqueous inkjet ink; and
b1) applying a heat treatment to the image by direct heating or by infrared radiation at a point in time which is at least 1 hour later than in step b).

11. The inkjet printing method according to claim 10, wherein the step of jetting the image in step a) and the step of jetting the second image in step a1) are performed simultaneously.

12. The inkjet printing method according to claim 10, wherein the image and the second image are identical after heat treatment.

13. The inkjet printing method according to claim 10, wherein the image and the second image are identical after heat treatment except for an alphanumerical date contained in the image and an alphanumerical date contained in the second image.

* * * * *

UNITED STATES PATENT AND TRADEMARK OFFICE
CERTIFICATE OF CORRECTION

| | | |
|---|---|---|
| PATENT NO. | : 10,767,063 B2 | Page 1 of 1 |
| APPLICATION NO. | : 15/574550 | |
| DATED | : September 8, 2020 | |
| INVENTOR(S) | : Loccufier et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 17 days.

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*